United States Patent
Uchida

(10) Patent No.: US 8,854,261 B2
(45) Date of Patent: Oct. 7, 2014

(54) PARAMETER CALCULATING METHOD, LONG-TERM PREDICTION ORBIT DATA PROVIDING METHOD, INFORMATION PROVIDING DEVICE, AND POSITIONING SYSTEM

(75) Inventor: Shuji Uchida, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1088 days.

(21) Appl. No.: 12/547,869

(22) Filed: Aug. 26, 2009

(65) Prior Publication Data

US 2010/0060519 A1  Mar. 11, 2010

(30) Foreign Application Priority Data

Sep. 10, 2008  (JP) .................................. 2008-232078

(51) Int. Cl.
*G01S 19/27* (2010.01)
*G01S 19/05* (2010.01)
*G01S 19/25* (2010.01)

(52) U.S. Cl.
CPC ............... *G01S 19/05* (2013.01); *G01S 19/258* (2013.01); *G01S 19/27* (2013.01)
USPC .................................................... 342/357.66

(58) Field of Classification Search
USPC .................................................... 342/357.15
See application file for complete search history.

(56) References Cited

U.S. PATENT DOCUMENTS

| 5,587,716 | A | * | 12/1996 | Sheynblat | 342/357.24 |
| 5,731,787 | A | * | 3/1998 | Sheynblat | 342/357.24 |
| 6,057,800 | A | * | 5/2000 | Yang et al. | 342/357.31 |
| 2002/0188403 | A1 | * | 12/2002 | LaMance et al. | 701/213 |
| 2005/0212700 | A1 | * | 9/2005 | Diggelen et al. | 342/357.06 |
| 2006/0055598 | A1 | * | 3/2006 | Garin et al. | 342/357.15 |
| 2007/0103364 | A1 | * | 5/2007 | Garin et al. | 342/357.15 |
| 2007/0299609 | A1 | | 12/2007 | Garin et al. | |
| 2008/0024361 | A1 | * | 1/2008 | Diggelen et al. | 342/357.03 |
| 2009/0115660 | A1 | * | 5/2009 | Garin et al. | 342/357.15 |
| 2010/0085247 | A1 | * | 4/2010 | Venkatraman et al. | 342/357.01 |
| 2010/0283681 | A1 | * | 11/2010 | Remondi et al. | 342/357.66 |

FOREIGN PATENT DOCUMENTS

| EP | 1637900 A | 3/2006 |
| JP | 2006-084426 A | 3/2006 |
| JP | 2008-003092 A | 1/2008 |
| WO | WO 2007092523 A2 * | 8/2007 |

* cited by examiner

*Primary Examiner* — Shelley Chen
(74) *Attorney, Agent, or Firm* — Global IP Counselors, LLP

(57) ABSTRACT

A parameter calculating method includes: setting lengths of prediction target terms as divisions of a predetermined effective period of a satellite orbit as variable lengths; and calculating a parameter of a predetermined orbit model expression used for approximating the satellite orbit based on prediction position data containing prediction positions of a positioning satellite in time series for each of the prediction target terms.

5 Claims, 17 Drawing Sheets

| PREDICTION ERROR RANGE | PREDICTION TARGET TERM |
|---|---|
| SHORTER THAN 10m | 4 HRS. |
| FROM 10m TO SHORTER THAN 20m | 6 HRS. |
| 20m OR LONGER | 8 HRS. |

FIG. 4
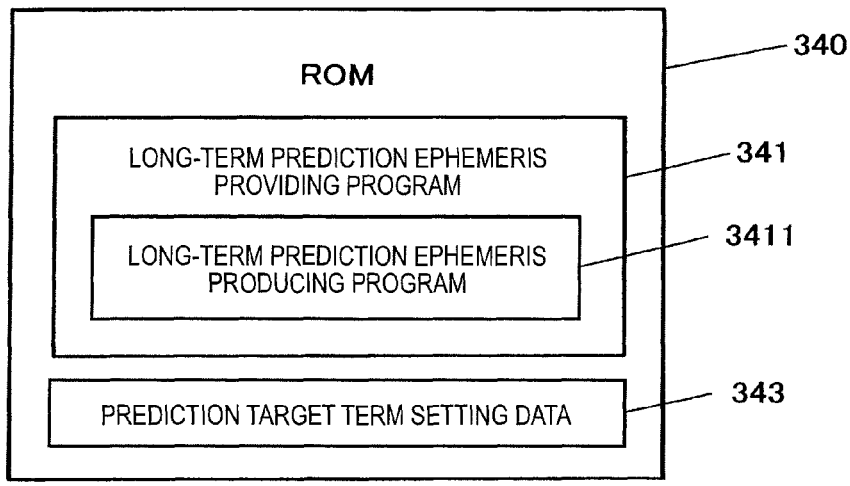
FIG. 5
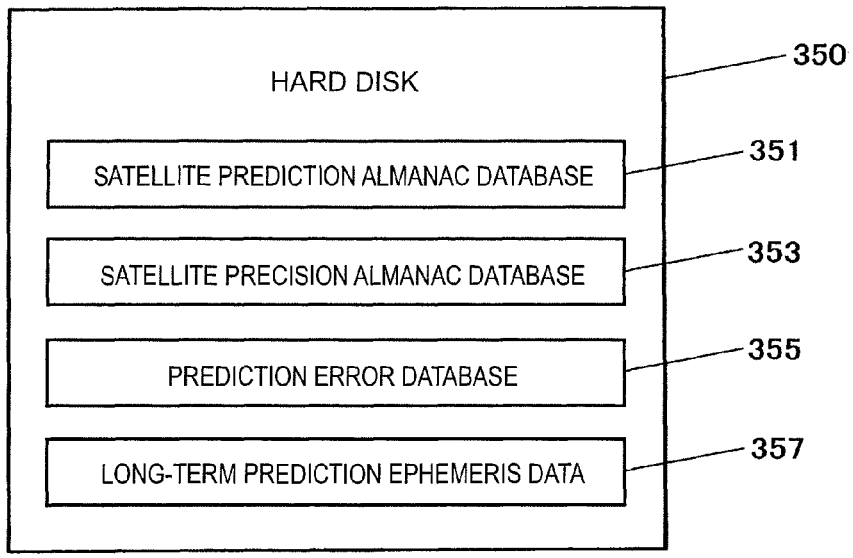
FIG. 6
| PREDICTION ERROR RANGE | PREDICTION TARGET TERM |
|---|---|
| SHORTER THAN 10m | 4 HRS. |
| FROM 10m TO SHORTER THAN 20m | 6 HRS. |
| 20m OR LONGER | 8 HRS. |

FIG.11

| | PARAMETER | PREDICTION TARGET TERM | 2008 8/8 0:00~4:00 | 2008 8/11 0:00~6:00 | ... | 2008 8/14 16:00~24:00 | |
|---|---|---|---|---|---|---|---|
| SATELLITE ORBIT PARAMETER | ORBIT SEMIMAJOR AXIS | | a1 | a2 | ... | a3 | |
| | ECCENTRICITY | | e1 | e2 | ... | e3 | |
| | ORBIT INCLINATION ANGLE | | $i_01$ | $i_02$ | ... | $i_03$ | |
| | ... | | ... | ... | ... | ... | |
| CLOCK CORRECTION PARAMETER | REFERENCE TIME OF SATELLITE CLOCK | | $t_c1$ | $t_c2$ | ... | $t_c3$ | |
| | OFFSET OF SATELLITE CLOCK | | $a_01$ | $a_02$ | ... | $a_03$ | |
| | DRIFT OF SATELLITE CLOCK | | $a_11$ | $a_12$ | ... | $a_13$ | |
| | DRIFT OF SATELLITE CLOCK FREQUENCY | | $a_21$ | $a_22$ | ... | $a_23$ | |
| | PREDICTION TARGET TERM LENGTH | | 4 HRS. | 6 HRS. | ... | 8 HRS. | |

3573 { 3573-1, 3573-2, 3573-3, ... }

PARAMETER CALCULATING METHOD, LONG-TERM PREDICTION ORBIT DATA PROVIDING METHOD, INFORMATION PROVIDING DEVICE, AND POSITIONING SYSTEM

The entire disclosure of Japanese Patent Application No. 2008-232078, filed Sep. 10, 2008 is expressly incorporated by reference herein.

BACKGROUND

1. Technical Field

The present invention relates to a parameter calculating method, a long-term prediction orbit data providing method, an information providing device, and a positioning system.

2. Related Art

Currently, GPS (global positioning system) is widely known as a positioning system using positioning signals, and is included in a positioning device contained in a cellular phone, a car navigation, or other apparatus. The GPS measures a position by performing positioning calculation to obtain a three-dimensional coordinate indicating the position of a GPS device and clock error based on information such as the positions of plural GPS satellites and the pseudo distances between the respective GPS satellites and the GPS device.

According to the positioning method by the GPS, the satellite information such as positions, speeds, and moving directions of the GPS satellites is obtained based on navigation data such as almanac and ephemeris superimposed on GPS satellite signals transmitted from the GPS satellites, and positioning calculation is performed using the satellite information and time information. Almanac is effective for capturing satellites, but is difficult to be used for positioning calculation due to insufficient accuracy of satellite information. On the other hand, ephemeris is effective for capturing satellites and can be used for positioning calculation as well since satellite information is sufficiently accurate. When positioning is started without ephemeris, ephemeris initially needs to be obtained from the GPS satellite signals. As a result, time to first fix (TTFF) increase signals.

US Patent Application/Publication No. 2002/0188403 and US Patent Application/Publication No. 2005/0212700 disclose a technology of a server client system which predicts long-term ephemeris (long-term prediction orbit data) as ephemeris for a long period such as one week using a server and provides the long-term prediction ephemeris to a positioning device as a client.

The long-term prediction ephemeris is defined by data format similar to that of normal ephemeris, for example. According to this method, a satellite orbit is approximated using Kepler's elliptic orbit model as one of satellite orbit approximation models, and long-term prediction ephemeris is defined based on parameters calculated by the model expression of used in this approximation (hereinafter referred to as "satellite orbit parameters"). Satellite prediction almanac (prediction position data) containing prediction positions as future positions of a positioning satellite predicted in time series at predetermined time intervals is provided by predetermined commercial system. Approximating calculation based on Kepler's elliptic orbit model can be performed by using the satellite prediction almanac.

According to a long-term prediction ephemeris producing method in related art, a target period for producing long-term prediction ephemeris such as one week (hereinafter referred to as "production target period") is divided into fixed "prediction target terms" such as four hours and six hours. In this case, satellite orbit parameters are calculated by approximating or predicting a satellite orbit for each of the prediction target terms to produce long-term prediction ephemeris. That is, long-term prediction ephemeris is produced with lengths of prediction target terms fixed. It is not a preferable method in some cases, however, to divide a long period such as one week into fixed prediction target terms.

SUMMARY

It is an advantage of some aspects of the invention to provide a new technology of producing long-term prediction ephemeris.

A first aspect of the invention is directed to a parameter calculating method including: setting lengths of prediction target terms as divisions of a predetermined effective period of a satellite orbit as variable lengths; and calculating a parameter of a predetermined orbit model expression used for approximating the satellite orbit based on prediction position data containing prediction positions of a positioning satellite in time series for each of the prediction target terms.

According to this configuration, the lengths of the prediction target terms as divisions of the predetermined effective period of the satellite orbit are set as variable lengths. Then, the parameter of the predetermined orbit model expression used for approximating the satellite orbit are calculated based on the prediction position data containing the prediction positions of the positioning satellite in time series for the prediction target terms.

The present inventors measured prediction errors as distances between the prediction positions of the positioning satellite contained in the prediction position data and actual positions of the corresponding positioning satellite. As a result, the inventors found that the prediction errors increase with elapse of time. According to this result, the prediction errors with short elapse of time from the present date and time are small. However, the prediction errors with long elapse of time from the present date and time become prominent.

In expressing a satellite orbit by orbit model expression (hereinafter referred to as "modeling"), the possibility of accurate reproduction of the prediction positions increase as the target term for modeling is shorter, and decrease as the target term is longer. Considering the relationship between the prediction errors and modeling, it is reasonable that the lengths of the prediction target terms of the satellite orbit increase as the terms become newer. By setting the lengths of the prediction target terms as divisions of the predetermined effective period of the satellite orbit as variable lengths, effective long-term prediction orbit data can be produced and provided.

A second aspect of the invention is directed to the parameter calculating method of the first aspect, further including setting the lengths of the prediction target terms based on the differences between actual positions of the positioning satellite associated with the past prediction positions and the corresponding past prediction positions.

A third aspect of the invention is directed to the parameter calculating method of the second aspect, further including setting the lengths of the prediction target terms such that the length increases as the difference between the actual position and the past prediction position becomes large.

According to this configuration, the length of the prediction target terms increases as the difference between the actual position of the positioning satellite associated with the past prediction positions and the past prediction positions becomes larger. When the difference between the actual position and the prediction position is large, the prediction error becomes large. In this case, it is preferable to increase the length of the prediction target term.

A fourth aspect of the invention is directed to the parameter calculating method of any of the first to third aspects, further including: setting the lengths of the prediction target terms as variable lengths for each of the positioning satellite; and calculating the parameters for the prediction target terms for each of the positioning satellite.

According to this configuration, the lengths of the prediction target terms are varied for each positioning satellite, and the parameters for the prediction target terms are calculated for each of the positioning satellite. The lengths of the prediction target terms are varied for each positioning satellite since changes of the prediction errors with elapse of time are different according to the positioning satellite.

A fifth aspect of the invention is directed to the parameter calculating method of any of the first to fourth aspect, further including calculating a parameter of a predetermined clock error model expression used for approximating change of clock prediction error of the positioning satellite at the prediction positions with elapse of time based on clock prediction error data containing the clock prediction error for the same terms as the prediction target terms.

According to this configuration, the parameter of the predetermined clock error model expression used for approximating change of the clock prediction error of the positioning satellite at the prediction positions with elapse of time are calculated based on the clock prediction error data containing the clock prediction error for the same terms as the prediction target terms. By this method, not only the parameters of the satellite orbit but also the parameters for correcting the clock error of the positioning satellite can be calculated.

A sixth aspect of the invention is directed to a method of providing long-term prediction orbit data containing the parameters calculated by the parameter calculating method of any of the first to fifth aspects for each of the prediction target terms.

According to this configuration, long-term prediction orbit data containing parameters for each of the plural prediction target terms having variable lengths can be provided.

A seventh aspect of the invention is directed to an information providing device including: a setting unit which sets lengths of prediction target terms as divisions of a predetermined effective period of a satellite orbit as variable lengths; a calculating unit which calculates a parameter of a predetermined orbit model expression used for approximating the satellite orbit based on prediction position data containing prediction positions of a positioning satellite in time series for each of the prediction target terms; and a providing unit which provides long-term prediction orbit data containing the parameters calculated by the calculating unit for each of the prediction target terms to a positioning device.

According to this configuration, the setting unit sets the lengths of the prediction target terms as divisions of the predetermined effective period of the satellite orbit as variable lengths. Then, the calculating unit calculates the parameter of the predetermined orbit model expression used for approximating the satellite orbit based on the prediction position data containing the prediction positions of the positioning satellite in time series for each of the prediction target terms set by the setting unit. Finally, the providing unit provides the long-term prediction orbit data containing the parameters calculated by the calculating unit for each of the prediction target terms to the positioning device. By this structure, advantages similar to those of the method according to the sixth aspect of the invention can be provided.

A eighth aspect of the invention is directed to a positioning system including: a positioning device; and an information providing device which provides long-term prediction orbit data to the positioning device. The information providing device includes a setting unit which sets lengths of prediction target terms as divisions of a predetermined effective period of a satellite orbit as variable lengths, a calculating unit which calculates a parameter of a predetermined orbit model expression used for approximating the satellite orbit based on prediction position data containing prediction positions of a positioning satellite in time series for each of the prediction target terms, and a providing unit which provides the long-term prediction orbit data containing the parameters calculated by the calculating unit for each of the prediction target terms to the positioning device. The positioning device includes a receiving unit which receives the long-term prediction orbit data from the information providing device, a selecting unit which selects the parameter for the prediction target term corresponding to positioning time from the long-term prediction orbit data, a capturing unit which produces the orbit model expression by using the parameter selected by the selecting unit, and calculates the position of the positioning satellite to capture a signal from the positioning satellite, and a positioning unit which measures the position of the satellite based on the signal captured by the capturing unit.

According to this configuration, in the information providing device, the setting unit sets the lengths of the prediction target terms as divisions of the predetermined effective period of the satellite orbit as variable lengths. Then, the calculating unit calculates the parameter of the predetermined orbit model expression used for approximating the satellite orbit based on the prediction position data containing the prediction positions of the positioning satellite in time series for each of the prediction target terms set by the setting unit. Finally, the providing unit provides the long-term prediction orbit data containing the parameters calculated by the calculating unit for each of the prediction target terms to the positioning device.

On the other hand, in the positioning device, the receiving unit receives the long-term prediction orbit data from the information providing device, and the selecting unit selects the parameter for the prediction target term corresponding to the positioning time from the long-term prediction orbit data received by the receiving unit. Then, the capturing unit produces the orbit model expression by using the parameter selected by the selecting unit, and calculates the position of the positioning satellite to capture a signal from the positioning satellite. Finally, the positioning unit measures the position of the satellite based on the signal captured by the capturing unit. By this structure, the positioning device can measure the position of the positioning satellite by using the long-term prediction orbit data supplied from the information providing device.

BRIEF DESCRIPTION OF THE DRAWINGS

The invention will be described with reference to the accompanying drawings, wherein like numbers reference like elements.

FIG. 4 shows an example of data stored in a ROM of the server system.

FIG. 5 shows an example of data stored in a hard disk of the server system.

FIG. 6 shows an example of data structure of prediction target term setting data.

FIG. 11 shows an example of data structure of prediction ephemeris.

DESCRIPTION OF EXEMPLARY EMBODIMENTS

A preferred embodiment according to the invention will be described with reference to the drawings. However, the invention is not limited to the embodiment described herein.

1. System Structure

Figure 1:
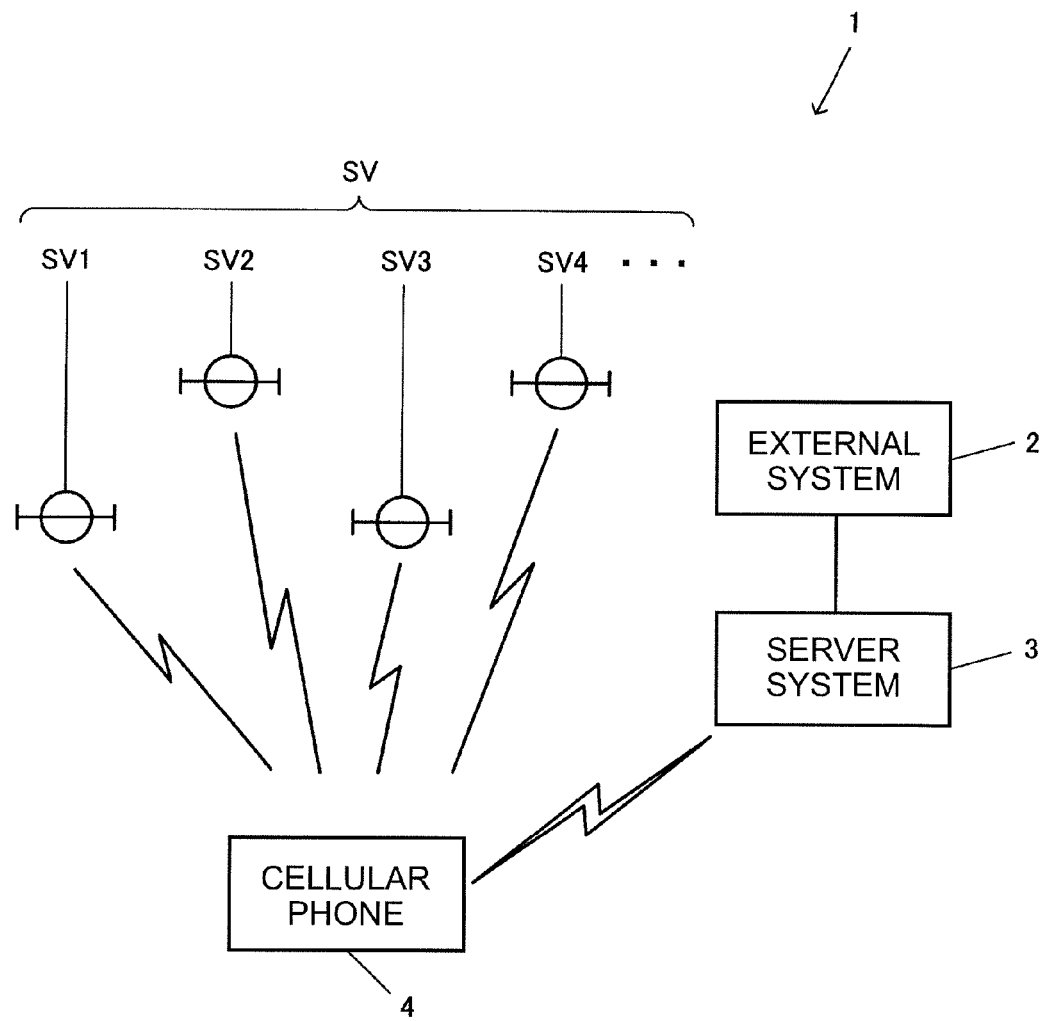
FIG. 1 illustrates a general structure of a positioning system.

FIG. 1 illustrates a general structure of a positioning system 1 according to this embodiment. The positioning system 1 includes an external system 2, a server system 3 as a type of information providing device, a cellular phone 4 as an electronic device having a positioning device, and a plurality of GPS satellites SV (SV1, SV2, SV3, SV4, and others). Positioning can be performed using the GPS satellites SV and the cellular phone 4 having necessary data received from the server system 3. Thus, it is considered that the cellular phone 4 and the GPS satellites SV constitute a positioning system. It is also considered that the server system 3 and the cellular phone 4 constitute a positioning system on the ground.

The external system 2 is a known system which periodically receives satellite signals from the GPS satellites SV, and produces satellite prediction almanac based on navigation data and the like contained in the satellite signals to provide the satellite prediction almanac to the server system 3. The satellite prediction almanac provided by the external system 2 is discontinuous position and clock error data showing predicted future positions of the respective GPS satellites SV as prediction positions and predicted errors of atomic clocks provided on the GPS satellites SV as clock prediction errors disposed in time series at predetermined time intervals (such as 15 minutes intervals).

The external system 2 provides not only the satellite prediction almanac as future data but also past fact data. More specifically, the external system 2 produces satellite precision almanac as past fact data containing actual positions of the GPS satellites SV and actual errors of atomic clocks provided on the GPS satellites SV as clock actual errors, and provides the satellite precision almanac to the server system 3. Since calculation of the actual positions and time actual errors is a known method, detailed explanation is not given herein. The external system 2 corresponds to a computer system of a private or public organization providing satellite prediction almanac and satellite precision almanac, for example.

The server system 3 is a system including a server which obtains satellite prediction almanac and satellite precision almanac from the external system 2, and produces and provides ephemeris predicted for all of the GPS satellites SV and effective for a long period of at least one day such as one week (hereinafter referred to "long-term prediction ephemeris (long-term prediction orbit data)" in this embodiment) by using the satellite prediction almanac and satellite precision almanac.

The cellular phone 4 is an electronic device through which a user receives and transmits telephone communication, mails and the like, and includes a positioning device providing position measuring function (positioning function) as well as original function such as reception and transmission of telephone communication and mails as cellular phone. The cellular phone 4 sends a request signal for long-term prediction ephemeris to the server system 3 in response to operation by the user, and receives the long-term prediction ephemeris from the server system 3. Then, the cellular phone 4 captures the GPS satellites SV by using the long-term prediction ephemeris thus received, and performs positioning calculation based on the satellite signals.

2. Principle

The present inventors measured prediction errors as distances between prediction positions contained in satellite prediction almanac produced by the external system 2 and actual positions contained in satellite precision almanac produced by the external system 2 for a target period of one week for all of the GPS satellites SV. As a result, the inventors found that the prediction errors increase with elapse of time for all of the GPS satellites SV with various degrees of increase depending on the GPS satellites SV.

Figure 2:
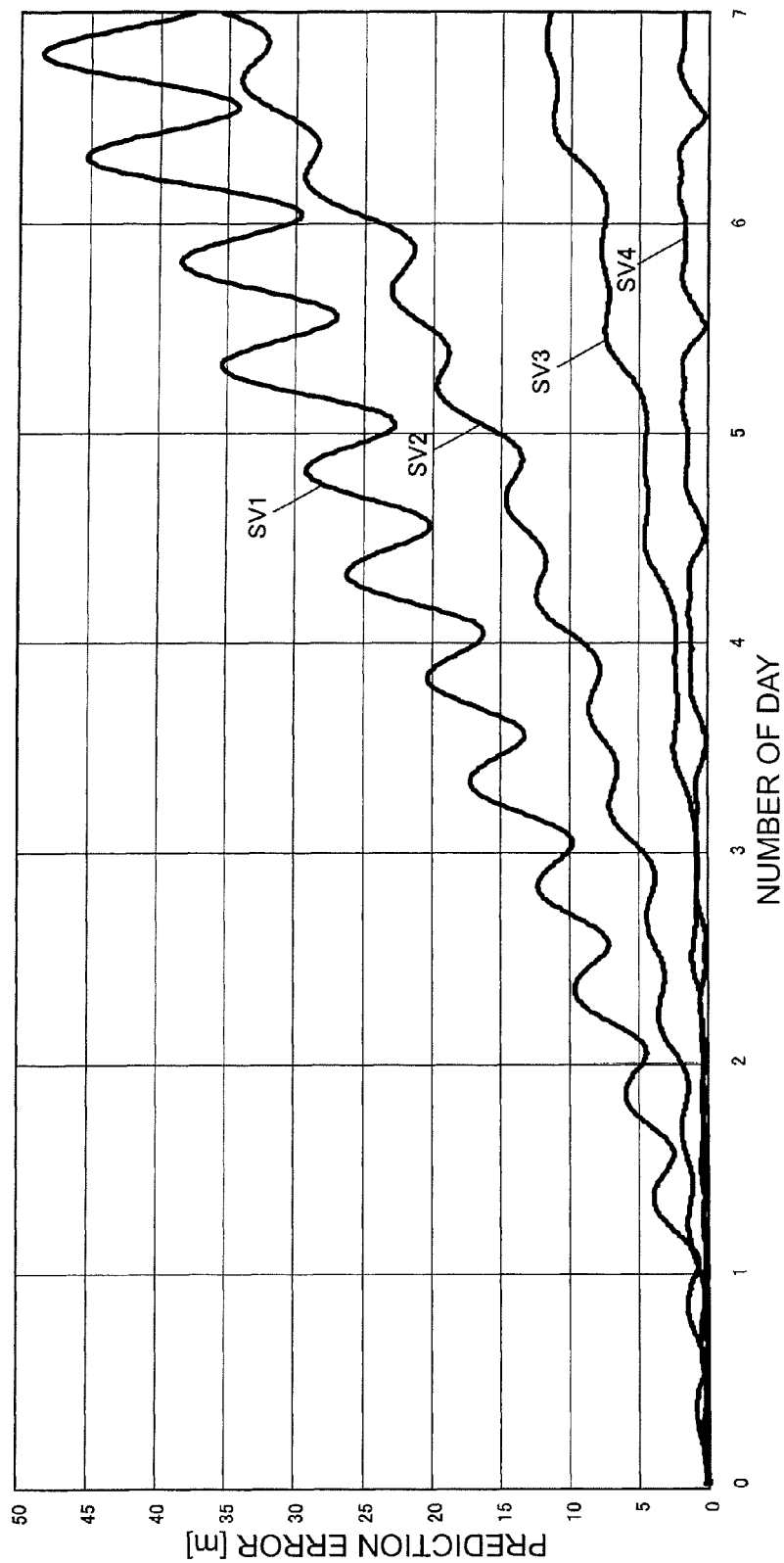
FIG. 2 is a graph showing changes of prediction errors with elapse of time as an example.

FIG. 2 is a graph plotting prediction errors as an example, where prediction errors of the four GPS satellites SV1 through SV4 as representative satellites for one week are plotted in time series. In FIG. 2, the horizontal axis indicates the number of days, and the vertical axis indicates prediction errors. As can be seen from the figure, the prediction errors gradually increase with fluctuations with elapse of time. Particularly, the prediction error of the GPS satellite SV1 rapidly increases with large fluctuations.

According to production of long-term prediction ephemeris, the period of producing long-term prediction ephemeris (period such as one week, hereinafter referred to as "production target period") is initially determined, and the production target period is divided into a plurality of terms during each of which a satellite orbit is approximated and modeled (hereinafter referred to as "prediction target terms"). The length of the production target period can be varied as necessary.

Then, prediction positions in each of the prediction target terms are extracted from prediction positions contained in the satellite prediction almanac received from the external system 2. Subsequently, Kepler's satellite orbit model expression (hereinafter referred to as "approximation model" as well) which minimizes the sum of squares of the distances from all of the extracted prediction positions is obtained for each of the prediction target terms. Parameters of the approximation model expressions of the satellite orbits obtained in this step are referred to as "satellite orbit parameters", and calculation for obtaining the approximation models is referred to as "approximation calculation" as well. Satellite orbits obtained by the approximation calculation are referred to as "prediction orbits".

According to the related art, the prediction target terms are fixed (terms of 4 or 6 hours, for example). In this embodiment, however, the prediction target terms are not fixed but varied according to the prediction errors considering the measurement results of the prediction errors discussed above. Since the level (degree) of variations of the prediction errors differ depending on the respective GPS satellites SV as apparent from the result in FIG. 2, the prediction target terms are set variable for each of the GPS satellites SV.

More specifically, the prediction target terms are set short in the initial part of the production target period, and are set longer in the later part of the production target period for all of the GPS satellites SV. The prediction target terms of the GPS satellites SV having larger degree of prediction error increase are set longer than those of the GPS satellites SV having smaller degree of prediction error increase. In this case, the prediction target terms are switched to long terms in early stage.

When the future positions of the satellites are calculated by the orbit model expressions for expressing the satellite orbits, differences are produced between the calculated future positions and the original prediction positions (the differences are hereinafter referred to as "modeling errors"). More specifically, the future positions of the satellites calculated by the orbit model expressions approximating the satellite orbits do not accurately reproduce all of the prediction positions. The number of the prediction positions increases as the prediction target terms become longer. In this case, the lengths of the orbits to be approximated increase accordingly. Thus, the modeling errors increase, and reproducibility of the prediction positions lowers.

Considering the relation between the prediction errors and the modeling terms discussed above, the prediction target terms are set short when the prediction errors are small in this embodiment. When the prediction errors become larger, the prediction target terms are set longer.

3. Server System 3-1. Function Structure

Figure 3:
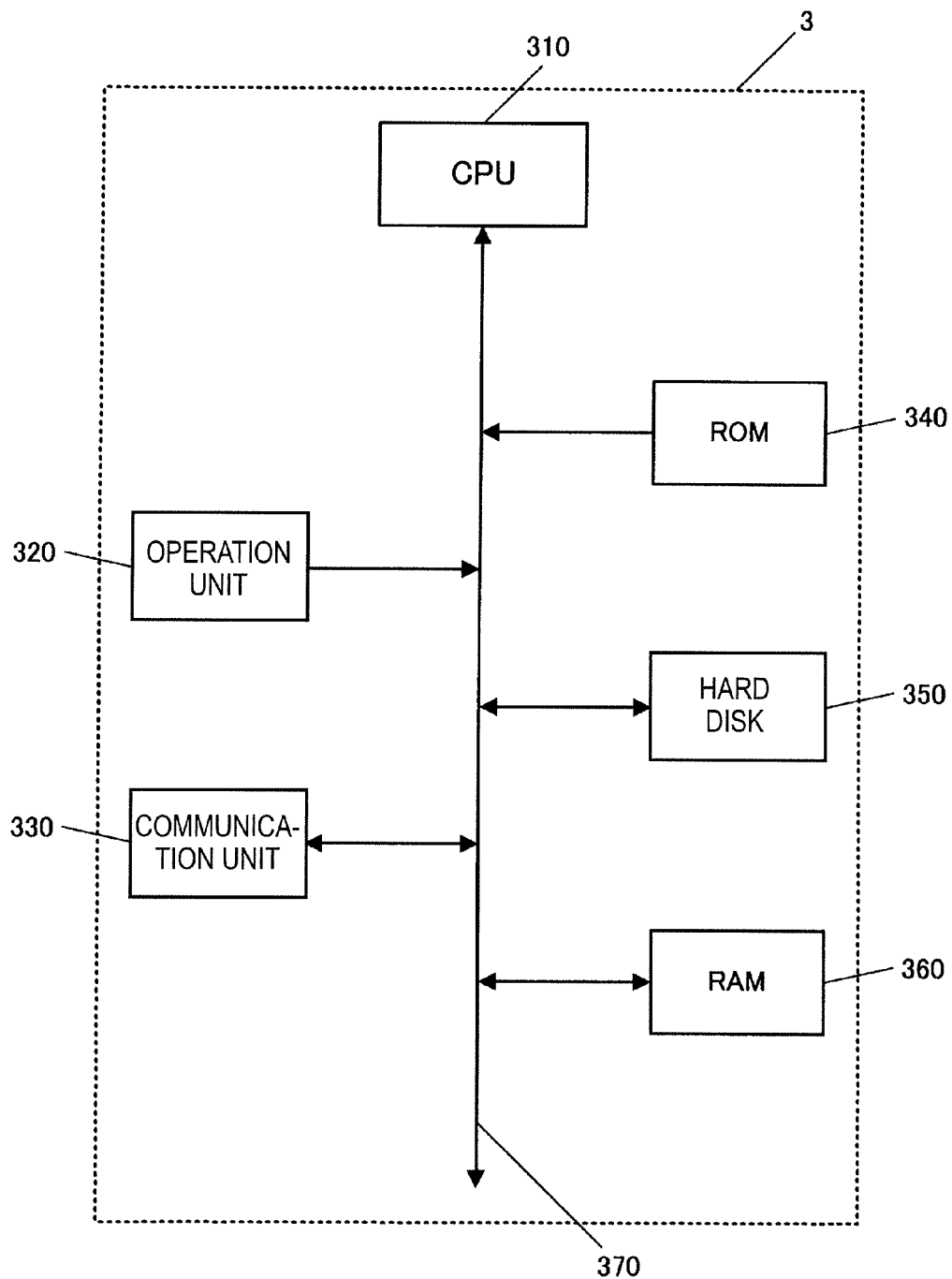
FIG. 3 is a block diagram showing a function structure of a server system.

FIG. 3 is a block diagram showing the function structure of the server system 3. The server system 3 is a computer system which includes a CPU (central processing unit) 310, an operation unit 320, a communication unit 330, a ROM (read only memory) 340, a hard disk 350, and a RAM (random access memory) 360. These units of the server system 3 are connected with each other via a bus 370.

The CPU 310 is a processor which collectively controls the respective units of the server system 3 under a system program or the like stored in the ROM 340. According to this embodiment, the CPU 310 performs process for providing long-term prediction ephemeris to the cellular phone 4 according to a long-term prediction ephemeris providing program 341 stored in the ROM 340.

The operation unit 320 is an input device which receives an operation command issued by a manager of the server system 3 and outputs a signal corresponding to the operation to the CPU 310. This function is provided through keyboard, button, mouse or the like.

The communication unit 330 is a communication device which exchanges various data used in the system with the external system 2 and the cellular phone 4 via communication network such as the Internet.

The ROM 340 is a non-volatile read-only memory unit which stores various programs and data such as the system program for controlling the server system 3, a program for providing long-term prediction ephemeris to the cellular phone 4, and a program for producing long-term prediction ephemeris by the CPU 310.

The hard disk 350 is a memory unit which reads and writes data using a magnetic head or the like, and stores programs and data for providing various types of functions of the server system 3 similarly to the ROM 340.

The RAM 360 is a volatile readable and writable memory unit, and has a work area for temporarily storing the system program, the long-term prediction ephemeris providing program, various processing programs, data used during respective processes, process results, and others performed by the CPU 310.

3-2. Data Structure

FIG. 4 shows an example of data stored in the ROM 340. The ROM 340 stores the long-term prediction ephemeris providing program 341 read and performed as long-term prediction ephemeris providing process (see FIG. 12) by the CPU 310, and prediction target term setting data 343. The long-term prediction ephemeris providing program 341 includes a long-term prediction ephemeris producing program 3411 performed as long-term prediction ephemeris producing process (see FIGS. 13 and 14) as sub routine.

According to the long-term prediction ephemeris providing process, the CPU 310 periodically performs process for producing long-term prediction ephemeris data. When receiving a request signal for long-term prediction ephemeris data from the cellular phone 4, the CPU 310 sends produced long-term prediction ephemeris data to the cellular phone 4 having requested the prediction ephemeris data. The long-term prediction ephemeris providing process will be described in detail later with reference to a flowchart.

The long-term prediction ephemeris producing process is a process for producing long-term prediction ephemeris data by the CPU 310. In this embodiment, long-term prediction ephemeris data is produced by the CPU 310 once for every four hours. More specifically, the production target period for one week from the date and time of producing long-term prediction ephemeris data is divided into a plurality of prediction target terms. Then, prediction ephemeris is produced for each of the divided prediction target terms, and long-term prediction ephemeris data containing prediction ephemeris for all of the prediction target terms is produced. The long-term prediction ephemeris producing process will be also described in detail later with reference to a flowchart.

FIG. 6 shows an example of data structure of the prediction target term setting data 343. The prediction target term setting data 343 contains a prediction error range 3431 which includes numerical value ranges of prediction errors, and a prediction target term 3433 set in association with the prediction error range 3431 containing the prediction errors. For example, when a prediction error is included in "20 m or longer" in the prediction error range 3431, the following prediction target term 3433 is set at "8 hours".

Figure 9:
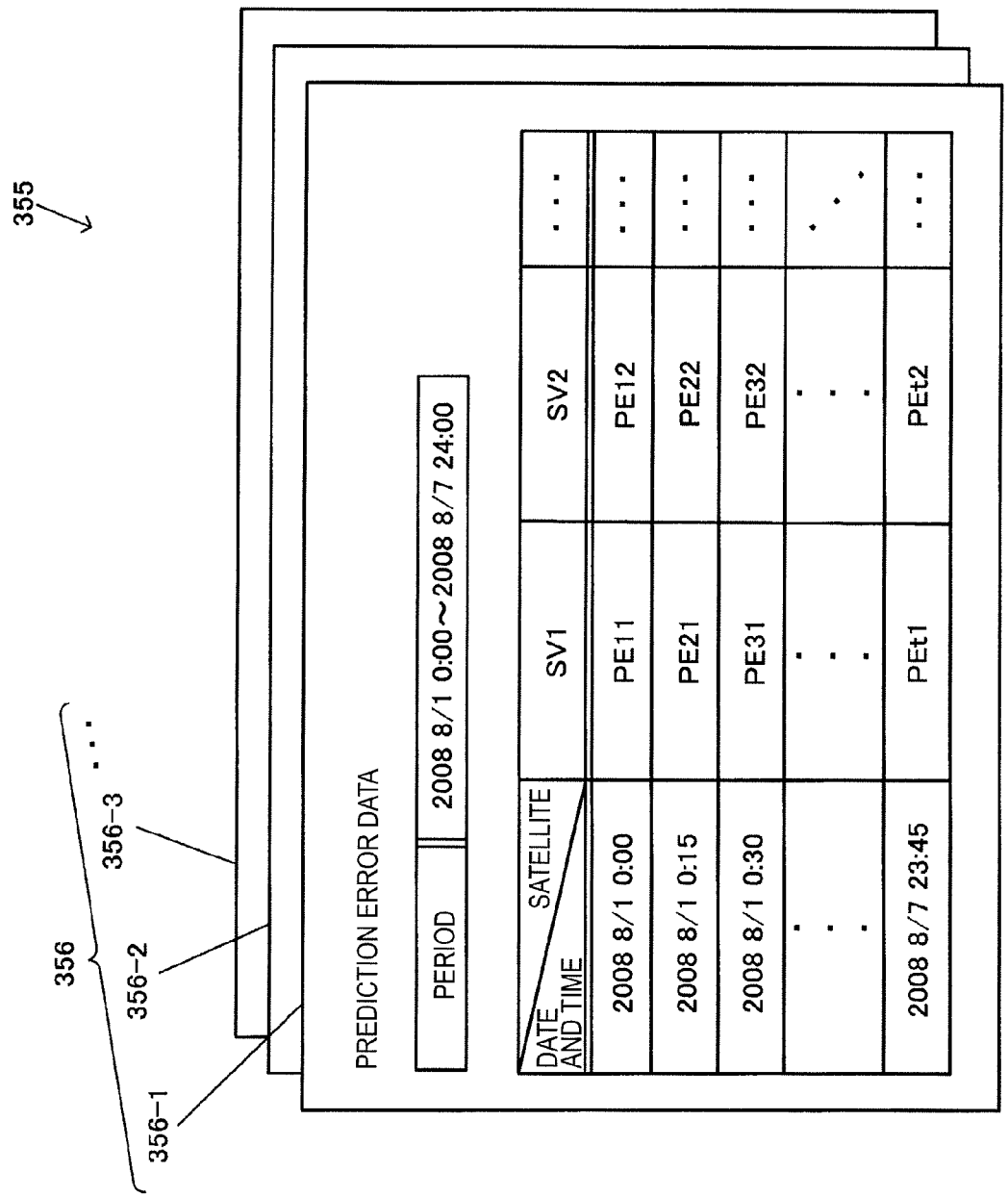
FIG. 9 shows an example of data structure of prediction error database.

The prediction error range 3431 is determined by judging which numerical value range contains a prediction error stored in prediction error data 356 shown in FIG. 9. The prediction error used for this judgment may be the average of the prediction errors of the prediction positions for a past certain period, or a prediction error at a certain time (such as AM 0:00 three days ago)

FIG. 5 shows an example of data stored in the hard disk 350. The hard disk 350 stores satellite prediction almanac database 351, satellite precision almanac database 353, prediction error database 355, and long-term ephemeris data 357.

Figure 7:
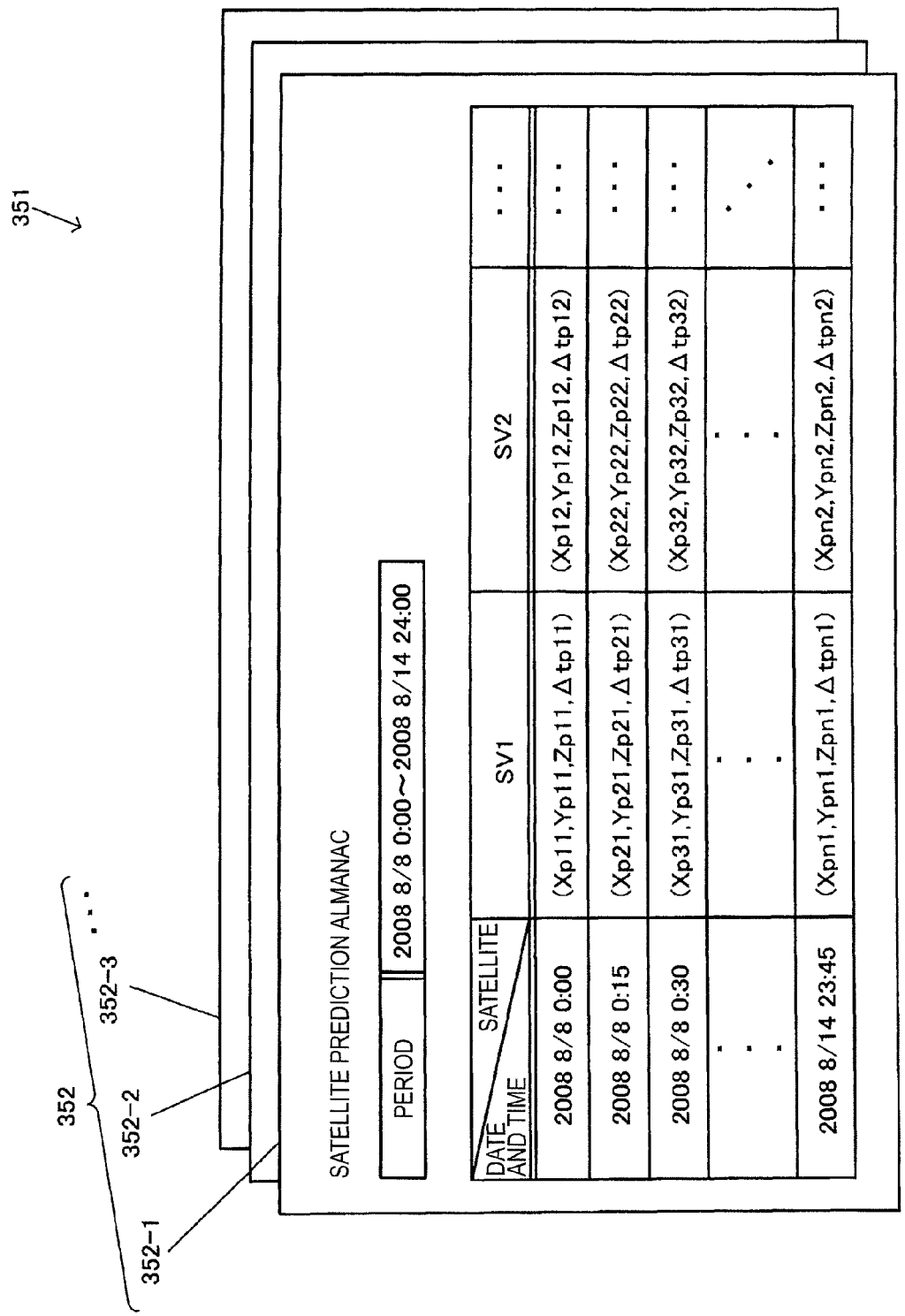
FIG. 7 shows an example of data structure of satellite prediction almanac database.

FIG. 7 shows an example of data structure of the satellite prediction almanac database 351. The satellite prediction almanac database 351 stores plural satellite prediction almanacs 352 (352-1, 352-2, 352-3, and others) in time series. The satellite prediction almanac 352 is discrete data including prediction positions and clock prediction errors for one week for the respective GPS satellites SV at intervals of 15 minutes, and containing the prediction positions and clock prediction errors for each of the predicted terms.

For example, the satellite prediction almanac 352-1 contains data in the period of "0:00, Aug. 8, 2008 through 24:00, Aug. 14, 2008". The prediction position of the GPS satellite "SV2" at "0:30, Aug. 8, 2008" is "(Xp32, Yp32, and Zp32)", and the prediction error of the atomic clock is "Δtp32". The CPU 310 periodically receives the satellite prediction almanac 352 from the external system 2 (such as once for every four hours), and accumulates and stores the satellite prediction almanac 352 in the satellite prediction almanac database 351.

Figure 8:
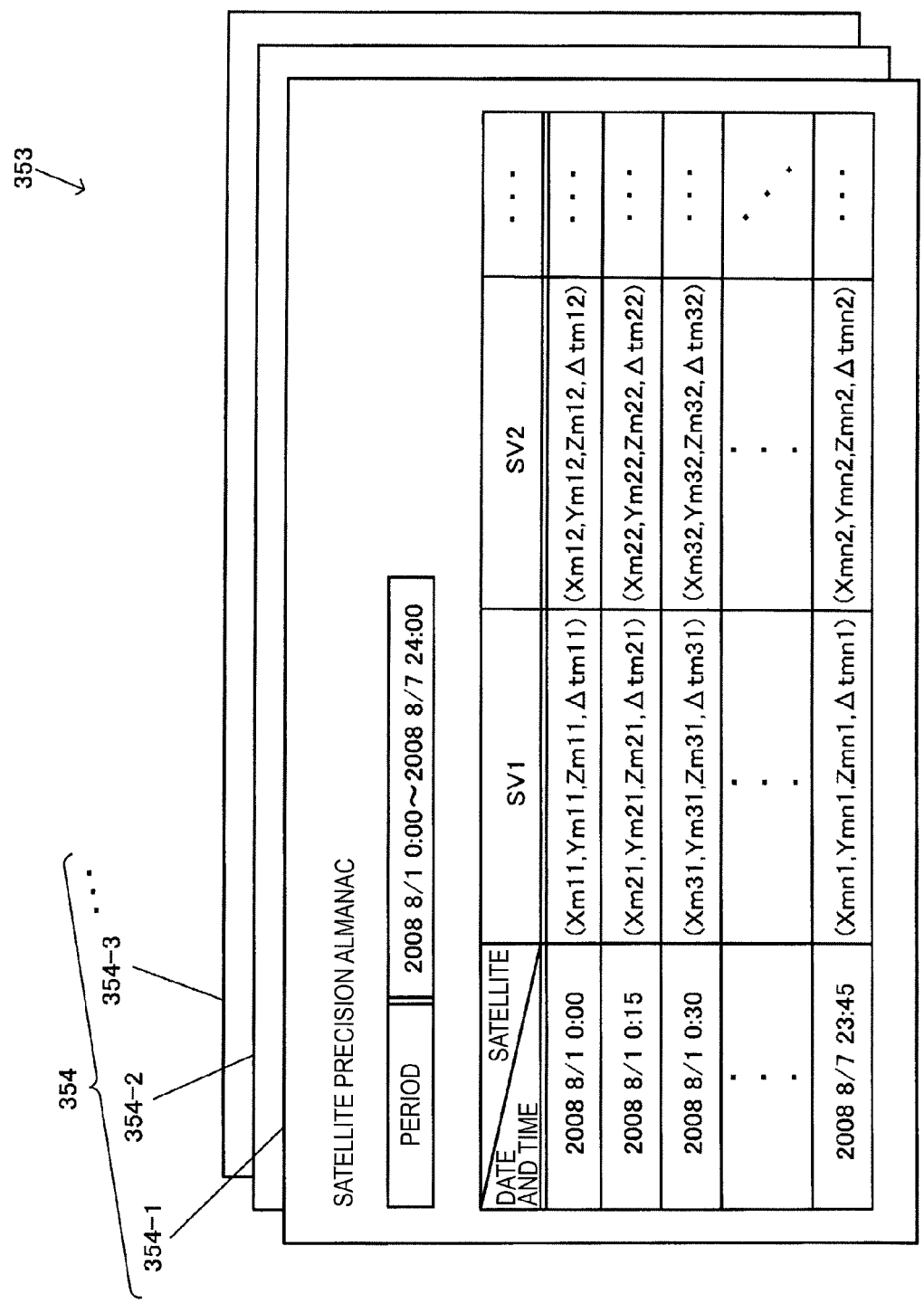
FIG. 8 shows an example of data structure of satellite precision almanac database.

FIG. 8 shows an example of data structure of the satellite precision almanac database 353. The satellite precision almanac database 353 stores plural satellite precision almanacs 354 (354-1, 354-2, 354-3, and others) in time series. The satellite precision almanac 354 is discrete data including actual positions and time actual errors for one week for the respective GPS satellites SV at intervals of 15 minutes, and containing the actual positions and time actual errors for each of the actually measured terms.

For example, the satellite precision almanac 354-1 contains data in the period of "0:00, Aug. 1, 2008 through 24:00, Aug. 7, 2008". The actual position of the GPS satellite "SV2" at "0:30, Aug. 1, 2008" is "(Xm32, Ym32, and Zm32)", and the actual error of the atomic clock is "Δtm32". The CPU 310 periodically receives the satellite precision almanac 354 from the external system 2 (such as once for every four hours), and accumulates and stores the satellite precision almanac 354 in the satellite precision almanac database 353.

FIG. 9 shows an example of data structure of the prediction error database 355. The prediction error database 355 stores plural pieces of prediction error data 356 (356-1, 356-2, 356-3, and others) in time series. The prediction error data 356 is data including prediction errors as the distances between the prediction positions contained in the satellite prediction almanac 352 and the actual positions contained in the satellite precision almanac 354 at the respective dates and times. The prediction error data 356 contains these data for each of the terms for calculating the prediction errors.

For example, the prediction error data 356-1 contains data in the period of "0:00, Aug. 1, 2008 through 24:00, Aug. 7, 2008". The prediction error of the GPS satellite "SV2" at "0:30, Aug. 1, 2008" is "PE32". The CPU 310 produces the prediction error data 356 by calculating prediction errors at the respective dates and times in the term corresponding to the latest satellite precision almanac 354 using the actual positions contained in the latest satellite precision almanac 354 and the prediction positions contained in the satellite prediction almanac 352 in the corresponding term in the long-term prediction ephemeris producing process, and accumulates and stores the produced prediction error data 356 in the prediction error database 355.

The CPU 310 judges which range of the prediction error range 3431 contains the prediction error stored in the prediction error data 356 by referring to the prediction target term setting data 343 stored in the ROM 340 to determine plural terms of the prediction target term 3433 set for the production target period.

Figure 10:
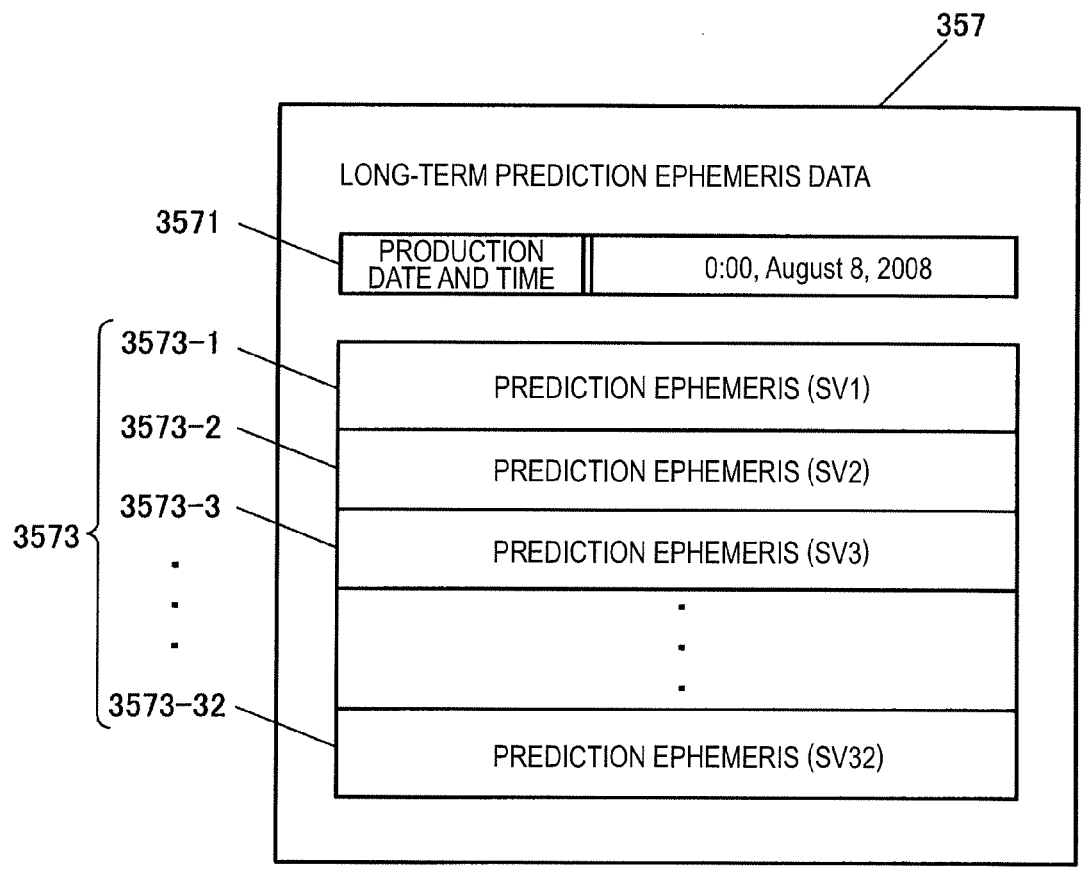
FIG. 10 shows an example of data structure of long-term prediction ephemeris data.

FIG. 10 shows an example of data structure of the long-term prediction ephemeris data 357. The long-term prediction ephemeris data 357 contains production date and time 3571 for producing long-term prediction ephemeris data and prediction ephemeris 3573 of the GPS satellites SV1 through SV32 (3573-1 through 3573-32) in association with each other.

FIG. 11 shows an example of data structure of the prediction ephemeris 3573. The prediction ephemeris 3573 (3573-1, 3573-2, up to 3573-32) stores Kepler's satellite orbit parameters such as orbit semimajor axis, eccentricity, and orbit inclination angle, clock correction parameters such as reference time of satellite clock, offset of satellite clock, drift of satellite clock, and drift of satellite clock frequency, and prediction target term length showing the length of the prediction target term for each of the prediction target terms.

The characteristic point is that a different prediction target term is set for each prediction ephemeris (GPS satellite SV). For example, the prediction ephemeris 3573-1 of the GPS satellite SV1 sets 8-hour prediction target term "from 16:00, Aug. 14, 2008 to 24:00 on the same date" as the final prediction target term. On the other hand, the prediction ephemeris 3573-3 of the GPS satellite SV3 sets 6-hour prediction target term "from 18:00, Aug. 14, 2008 to 24:00 on the same date" as the final prediction target term.

3-3. Flow of Process

Figure 12:
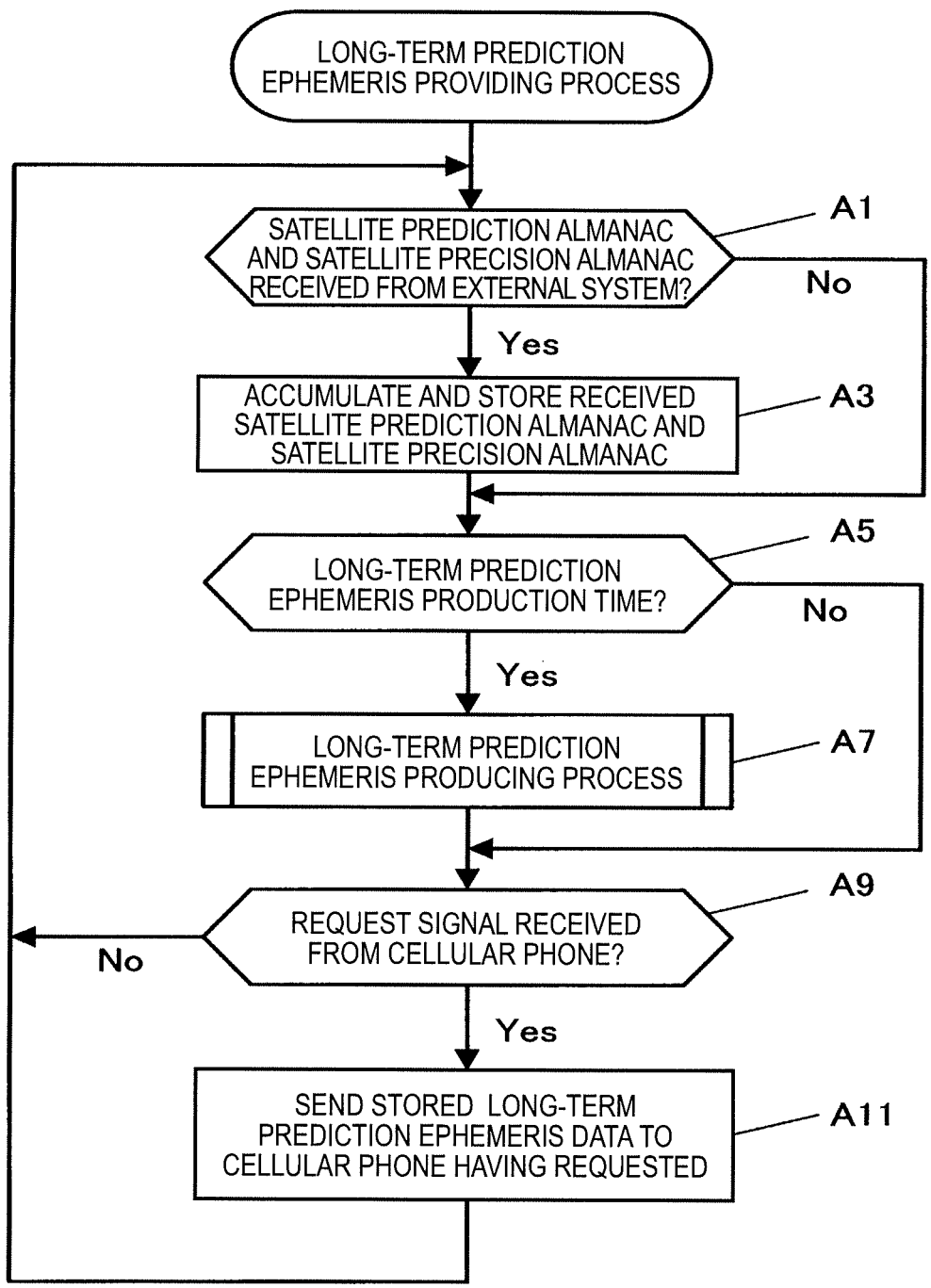
FIG. 12 is a flowchart showing flow of long-term prediction ephemeris providing process.

FIG. 12 is a flowchart showing the flow of long-term prediction ephemeris providing process performed by the server system 3 under the long-term prediction ephemeris providing program 341 in the ROM 340 read and executed by the CPU 310.

Initially, the CPU 310 judges whether the satellite prediction almanac 352 and the satellite precision almanac 354 have been received from the external system 2 (step A1). When it is judged that the satellite prediction almanac 352 and the satellite precision almanac 354 have not been received (step A1; NO), the flow shifts to step A5. When it is judged that the satellite prediction almanac 352 and the satellite precision almanac 354 have been received (step A1; YES), the received satellite prediction almanac 352 and satellite precision almanac 354 are accumulated and stored in the satellite prediction almanac database 351 and the satellite precision almanac database 353 of the hard disk 350 (step A3).

Then, the CPU 310 judges whether it is the time for producing long-term prediction ephemeris (step A5). In this embodiment, long-term prediction ephemeris is produced once for every four hours. When it is judged that it is not the production time (step A5; NO), the CPU 310 shifts the flow to step A9.

When it is judged that it is the time for producing long-term prediction ephemeris (step A5; YES), the CPU 310 performs the long-term prediction ephemeris producing process by reading and executing the long-term prediction ephemeris producing program 3411 stored in the ROM 340 (step A7).

Figure 13:
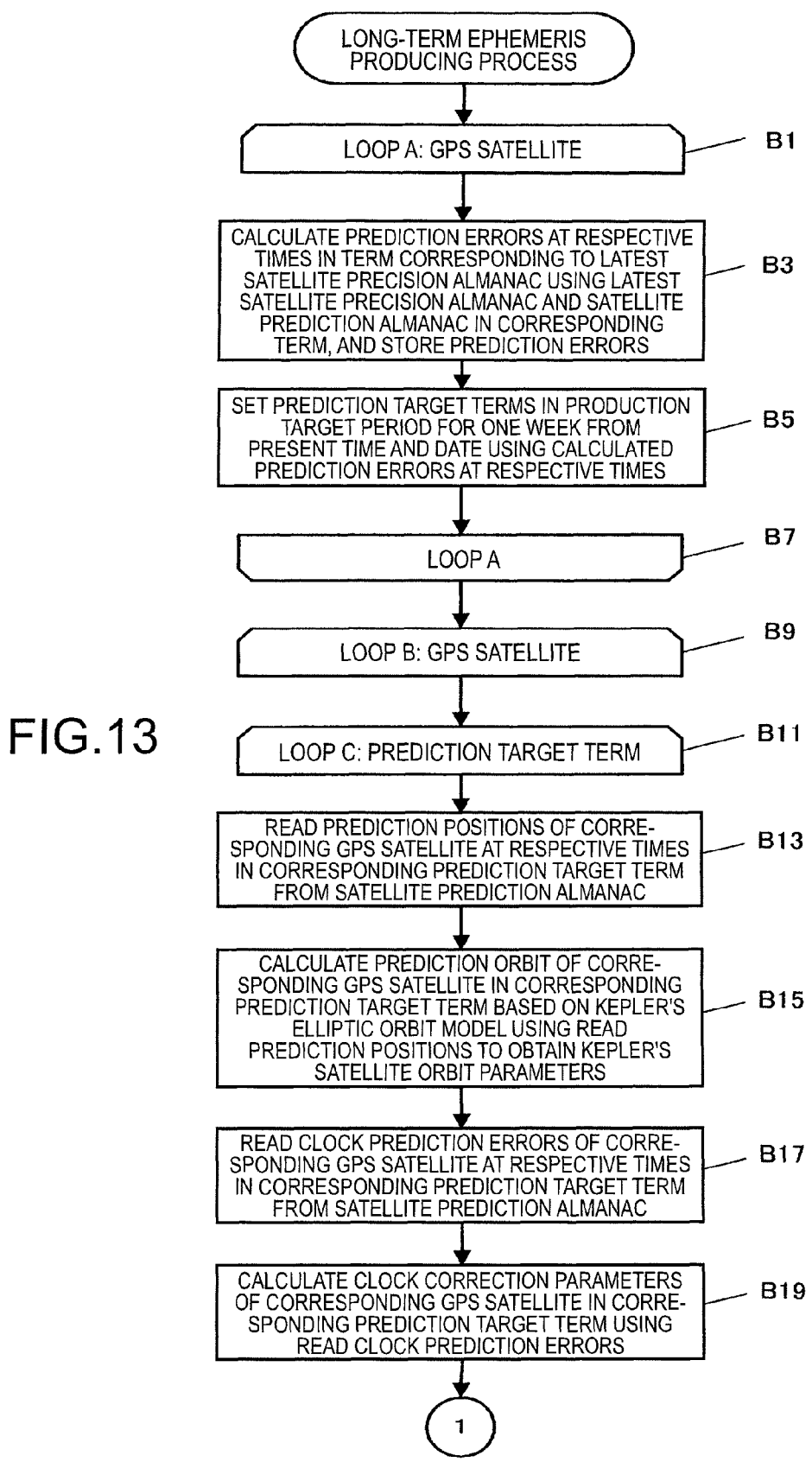
FIG. 13 is a flowchart showing flow of long-term prediction ephemeris producing process.
Figure 14:
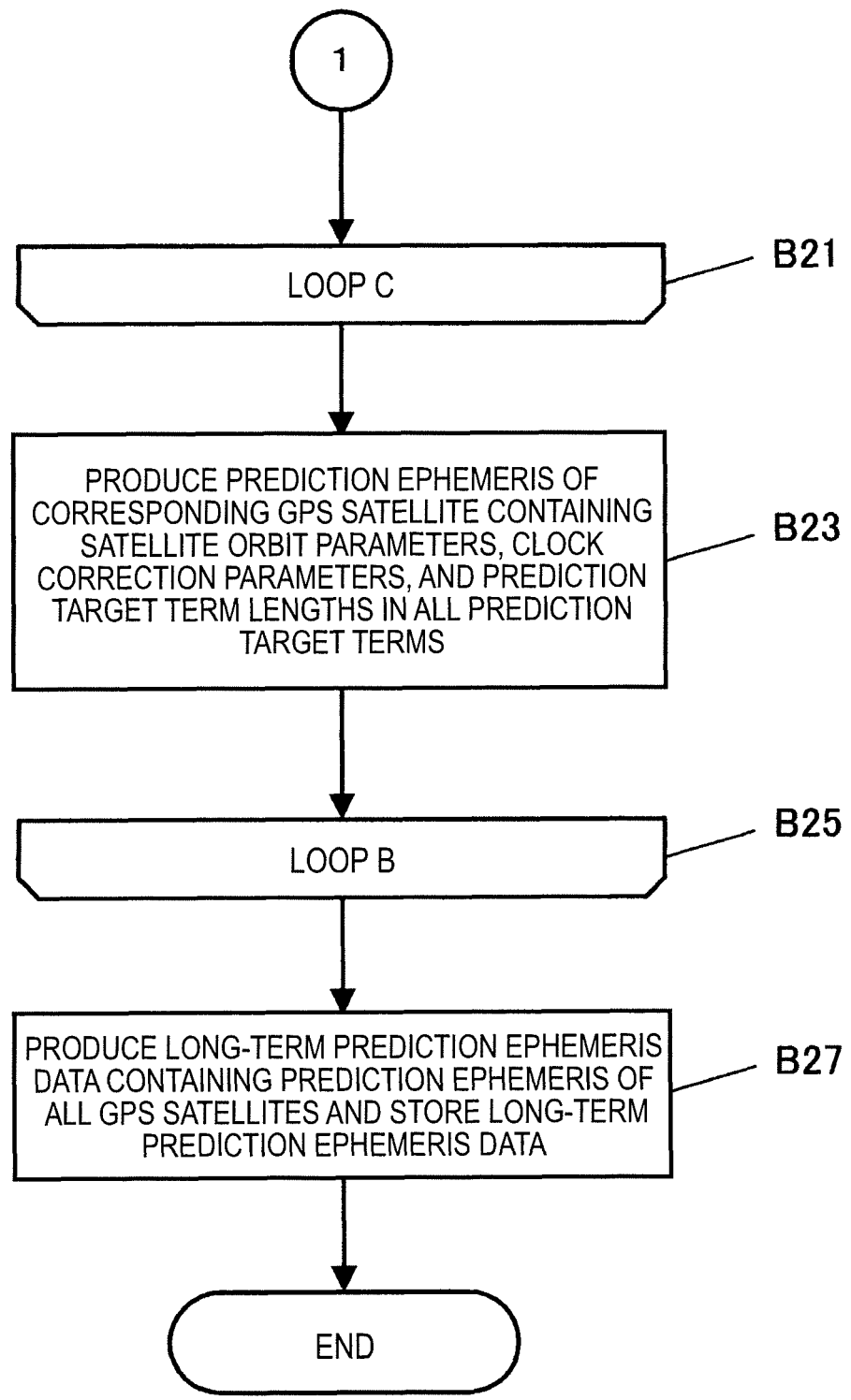
FIG. 14 is a flowchart showing flow of the long-term prediction ephemeris producing process.

FIGS. 13 and 14 are flowcharts showing the flow of the long-term prediction ephemeris producing process.

Initially, the CPU 310 performs the process of loop A for each of the GPS satellites SV (steps B1 through B7). In the process of loop A, the CPU 310 calculates the prediction errors at the respective times (15 minutes intervals) in the term corresponding to the latest satellite precision almanac 354 based on the latest satellite precision almanac 354 and the satellite prediction almanac 352 in the corresponding term to produce the prediction error data 356, and accumulates and stores the prediction error data 356 in the prediction error database 355 (step B3).

The CPU 310 refers the prediction target term setting data 343 stored in the ROM 340, and sets the respective prediction target terms in the production target period for one week from the present date and time by using the prediction errors at the respective times calculated in step B3 (step B5). Then, the CPU 310 shifts the flow to the next GPS satellite SV.

After finishing the processes in steps B3 and B5 for all of the GPS satellites SV, the CPU 310 ends the process of loop A (step B7). After ending the process of loop A, the CPU 310 performs the process of loop B for the respective GPS satellites SV (steps B9 through B25).

In the process of loop B, the CPU 310 executes the process of loop C for each of the prediction target terms (steps B11 through B21) In the process of loop C, the CPU 310 reads the prediction positions of the corresponding GPS satellite SV at the respective times in the corresponding prediction target term from the latest satellite prediction almanac 352 stored in the satellite prediction almanac database 351 of the hard disk 350 (step B13).

The CPU 310 calculates the prediction orbit of the corresponding GPS satellite SV in the corresponding prediction target term according to the Kepler's elliptic orbit model by using the prediction positions read in step B13 to obtain the Kepler's satellite orbit parameters (step B15). The specific calculation method of the prediction orbit is a known method, and thus detailed explanation of the calculation method is not given herein.

The CPU 310 reads the clock prediction errors of the corresponding GPS satellite SV at the respective times in the corresponding prediction target term from the latest satellite prediction almanac 352 (step B17). Then, the CPU 310 obtains clock correction parameters of the corresponding GPS satellite for the corresponding prediction target term by using the read clock prediction errors (step B19). Then, the CPU 310 shifts the flow to the next prediction target term.

A clock prediction error "$\Delta t$" at a time "t" can be approximated by the following equation (1) using the clock correction parameters such as reference time of satellite clock "$t_c$", offset of satellite clock "$a_0$", drift of satellite clock "$a_1$", and drift of satellite clock frequency "$a_2$".

$$\Delta t = a_0 + a_1(t-t_c) + a_2(t-t_c)^2 \quad (1)$$

The equation (1) is a clock error model equation for approximating changes of clock prediction errors with elapse of time. The clock correction parameters can be calculated by performing approximation calculation using minimum square method, for example, based on the clock prediction errors "$\Delta t$" at the respective times contained in the satellite prediction almanac 352 as sampling data.

After executing the processes in steps B13 through B19 for all of the prediction target terms, the CPU 310 ends the process of loop C (step B21). Then, the CPU 310 produces the prediction ephemeris 3573 of the corresponding GPS satellite SV containing the satellite orbit parameters obtained in step B15, the clock correction parameters obtained in step B19, and the prediction target term lengths for all of the prediction target terms (step B23). Then, the CPU 310 shifts the flow to the next GPS satellite SV.

After finishing the processes in steps B11 through B23 for all of the GPS satellites SV, the CPU 310 ends the process of loop B (step B25). Then, the CPU 310 produces the long-term prediction ephemeris data 357 containing the prediction ephemeris 3573 produced in step B23 for all of the GPS satellites SV in association with the production date and time 3571, and stores the long-term prediction ephemeris data 357 in the hard disk 350 (step B27). Then, the CPU 310 ends the long-term prediction ephemeris producing process.

Returning to the long-term prediction ephemeris providing process shown in FIG. 12, the CPU 310 having finished the long-term prediction ephemeris producing process judges whether a request signal for the long-term prediction ephemeris data 357 has been received from the cellular phone 4 (step A9). When it is judged that the request signal has not been received (step A9; NO), the flow returns to step A1.

When it is judged that the request signal has been received (step A9; YES), the CPU 310 transmits the long-term prediction ephemeris data 357 stored in the hard disk 350 to the cellular phone 4 having requested (step A11). Then, the CPU 310 returns the flow to step A1.

4. Cellular Phone 4-1. Function Structure

Figure 15:
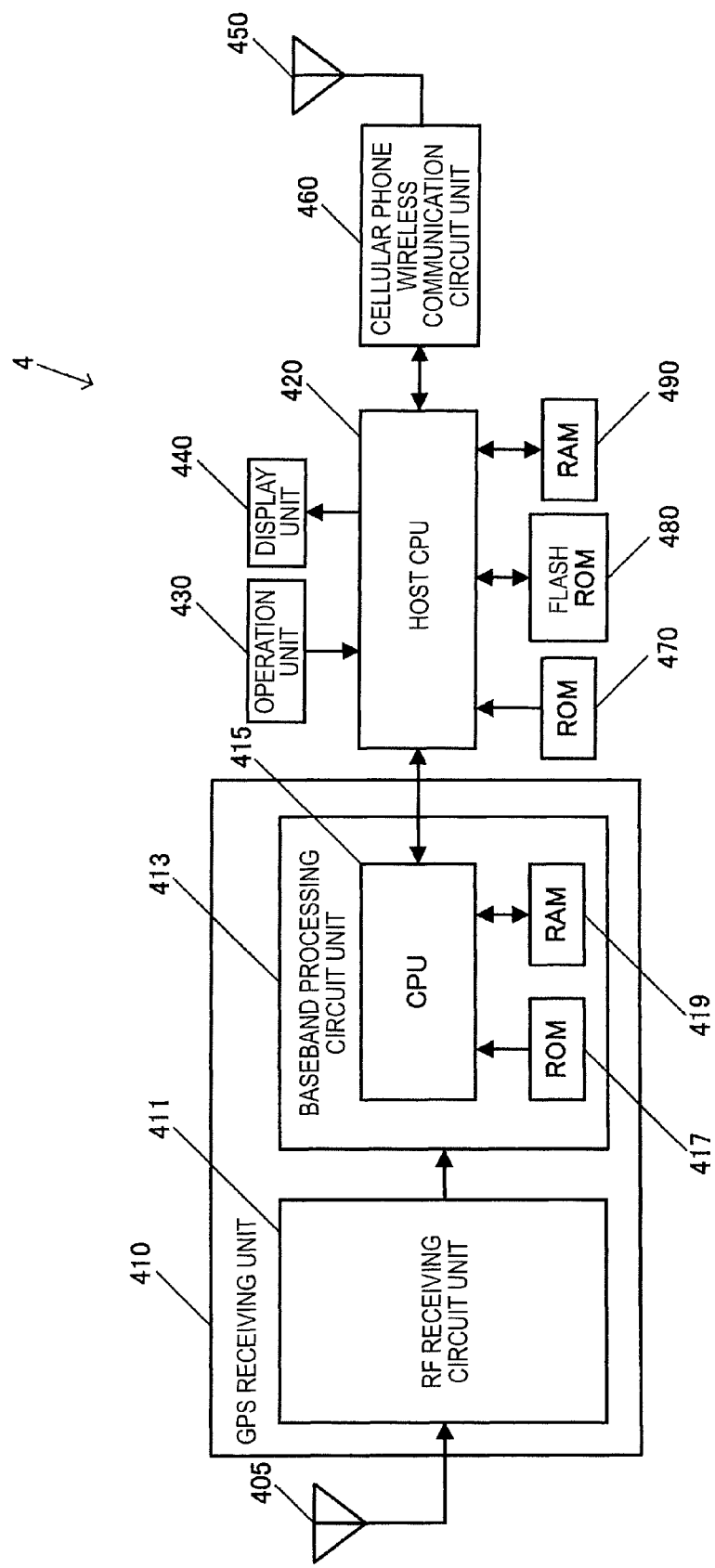
FIG. 15 is a block diagram showing a function structure of a cellular phone.

FIG. 15 is a block diagram showing the function structure of the cellular phone 4. The cellular phone 4 includes a GPS antenna 405, a GPS receiving unit 410, a host CPU 420, an operation unit 430, a display unit 440, a cellular phone antenna 450, a cellular phone wireless communication circuit unit 460, a ROM 470, a flash ROM 480, and a RAM 490.

The GPS antenna 405 is an antenna which receives RF (radio frequency) signals containing GPS satellite signals transmitted from the GPS satellites SV, and outputs the received signals to the GPS receiving unit 410. The GPS satellite signals are communication signals having 1.57542 [GHz] and modulated by direct spectrum diffusion system using PRN (pseudo random noise) codes as a type of diffusion codes different for each satellite. The PRN codes are pseudo random noise codes having repetitive cycle of 1 ms and having code length of 1,023 chips as 1 PN frame.

The GPS receiving unit 410 is a positioning circuit for measuring positions based on the signals outputted from the GPS antenna 405 as a function block corresponding to a so-called GPS receiver. The GPS receiving unit 410 includes an RF (radio frequency) receiving circuit unit 411, and a baseband processing circuit unit 413. The RF receiving circuit unit 411 and the baseband processing circuit unit 413 can be manufactured as separate LSI (large scale integration), or as 1 chip unit.

The RF receiving circuit unit 411 is a circuit block for processing RF signals, and produces oscillation signals to be multiplied by RF signals by dividing or multiplying predetermined local oscillation signals. The RF signals outputted from the GPS antenna 405 are multiplied by the produced oscillation signals to be down-converted into intermediate frequency signals (hereinafter referred to as "IF (intermediate frequency) signals"). Then, the IF signals are amplified or processed in other ways, and converted into digital signals by an A/D (analog/digital) converter to be outputted to the baseband processing circuit unit 413.

The baseband processing circuit unit 413 is a circuit unit for capturing and extracting GPS satellite signals by applying correlation process or the like to the IF signals outputted from the RF receiving circuit unit 411. The baseband processing circuit unit 413 has a CPU 415 as processor, and a ROM 417 and a RAM 419 as memories. The CPU 415 captures and extracts the GPS satellite signals using the long-term prediction ephemeris data 357 obtained from the server system 3 via the host CPU 420.

The host CPU 420 is a processor which collectively controls the respective units of the cellular phone 4 according to various programs such as positioning calculation program and system program stored in the ROM 470. The host CPU 420 performs positioning calculation according to GPS satellite signals captured and extracted by the baseband processing circuit unit 413. Then, the host CPU 420 displays a navigation screen where measured positions resulting from positioning calculation are plotted on the display unit 440.

The operation unit 430 is an input device which includes a touch panel, button switches and the like, and outputs signals corresponding to pressed icons and buttons to the host CPU 420. Various types of commands such as telephone communication request, mail transmission and reception request, and GPS startup request are inputted through operation of the operation unit 430.

The display unit 440 is a display device constituted by LCD (liquid crystal display) or the like to provide various displays corresponding to display signals received from the host CPU 420. The display unit 440 displays navigation screen, time information and the like.

The cellular phone antenna 450 is an antenna which transmits and receives cellular phone wireless signals to and from a wireless base station provided by a communication service provider of the cellular phone 4.

The cellular phone wireless communication circuit unit 460 is a cellular phone communication circuit unit including an RF converting circuit, a baseband processing circuit and the like. The cellular phone wireless communication circuit unit 460 provides telephone communication and mail transmission and reception by modulating and demodulating cellular phone wireless signals.

The ROM 470 is a non-volatile read-only memory unit which stores various programs and data such as a system program for controlling the cellular phone 4 by the host CPU 420, a positioning calculation program for performing positioning calculation, and a navigation program for providing navigation function.

The flash ROM 480 is a readable and writable non-volatile memory unit which stores various programs and data for controlling the cellular phone 4 by the host CPU 420 similarly to the ROM 470. The data stored in the flash ROM 480 is not lost even after the power source of the cellular phone 4 is turned off.

The RAM 490 is a readable and writable volatile memory unit which has a work area for temporarily storing the system program, the positioning calculation program, various processing programs, data used during various processes, process results and the like performed by the host CPU 420.

4-2. Data Structure

Figure 16:
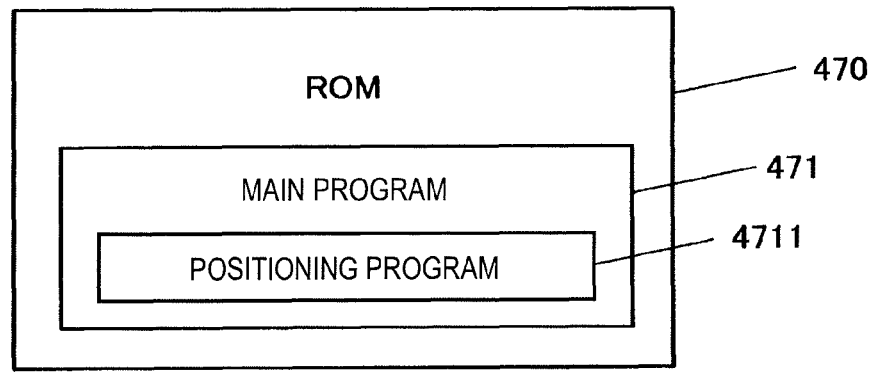
FIG. 16 shows an example of data stored in a ROM of the cellular phone.

FIG. 16 shows an example of data stored in the ROM 470. The ROM 470 stores a main program 471 to be read and performed by the host CPU 420 as main process (see FIG. 19). The main program 471 contains a positioning program 4711 performed as positioning process (see FIGS. 20 and 21) in the form of sub routine.

The main process performed by the host CPU 420 includes process for providing telephone communication and mail transmission and reception as the original function of the cellular phone 4, process for increasing the speed of initial positioning after turning on the power source of the cellular phone 4, process for measuring the position of the cellular phone 4 (positioning process), and other processes. The main process will be described in detail later with reference to a flowchart.

In the positioning process, the host CPU 420 captures GPS satellite signals from the GPS satellites SV by using the long-term prediction ephemeris data 357 received from the server system 3, and measures the position of the cellular phone 4 based on the captured GPS satellite signals to output the position of the cellular phone 4. The positioning process will be described in detail later with reference to a flowchart as well.

Figure 17:
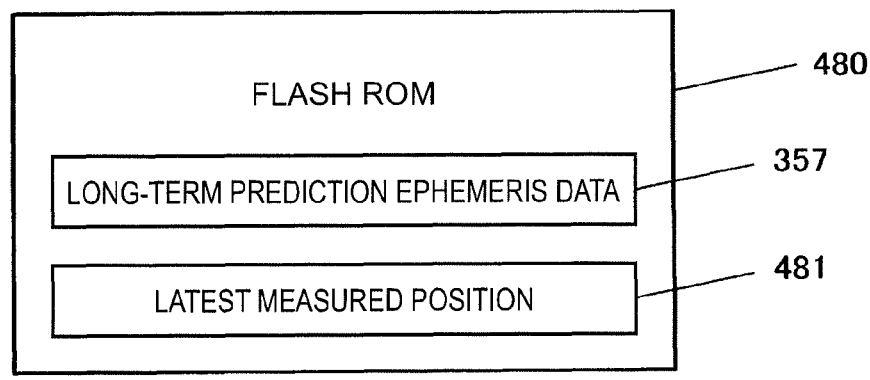
FIG. 17 shows an example of data stored in a flash ROM of the cellular phone.

FIG. 17 shows an example of data stored in the flash ROM 480. The flash ROM 480 stores the long-term prediction ephemeris data 357 received from the server system 3, and a latest measured position 481. The long-term prediction ephemeris data 357 and the latest measured position 481 are updated by the host CPU 420 during the main process.

Figure 18:
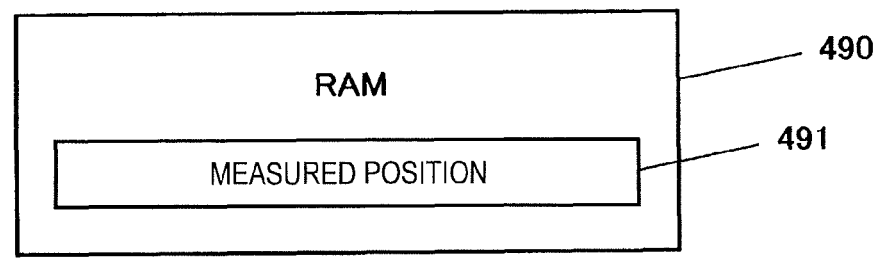
FIG. 18 shows an example of data stored in a RAM of the cellular phone.

FIG. 18 shows an example of data stored in the RAM 490. The RAM 490 stores a measured position 491 obtained by the positioning process. The measured position 491 is updated by the host CPU 420 during the main process.

4-3. Flow of Process

Figure 19:
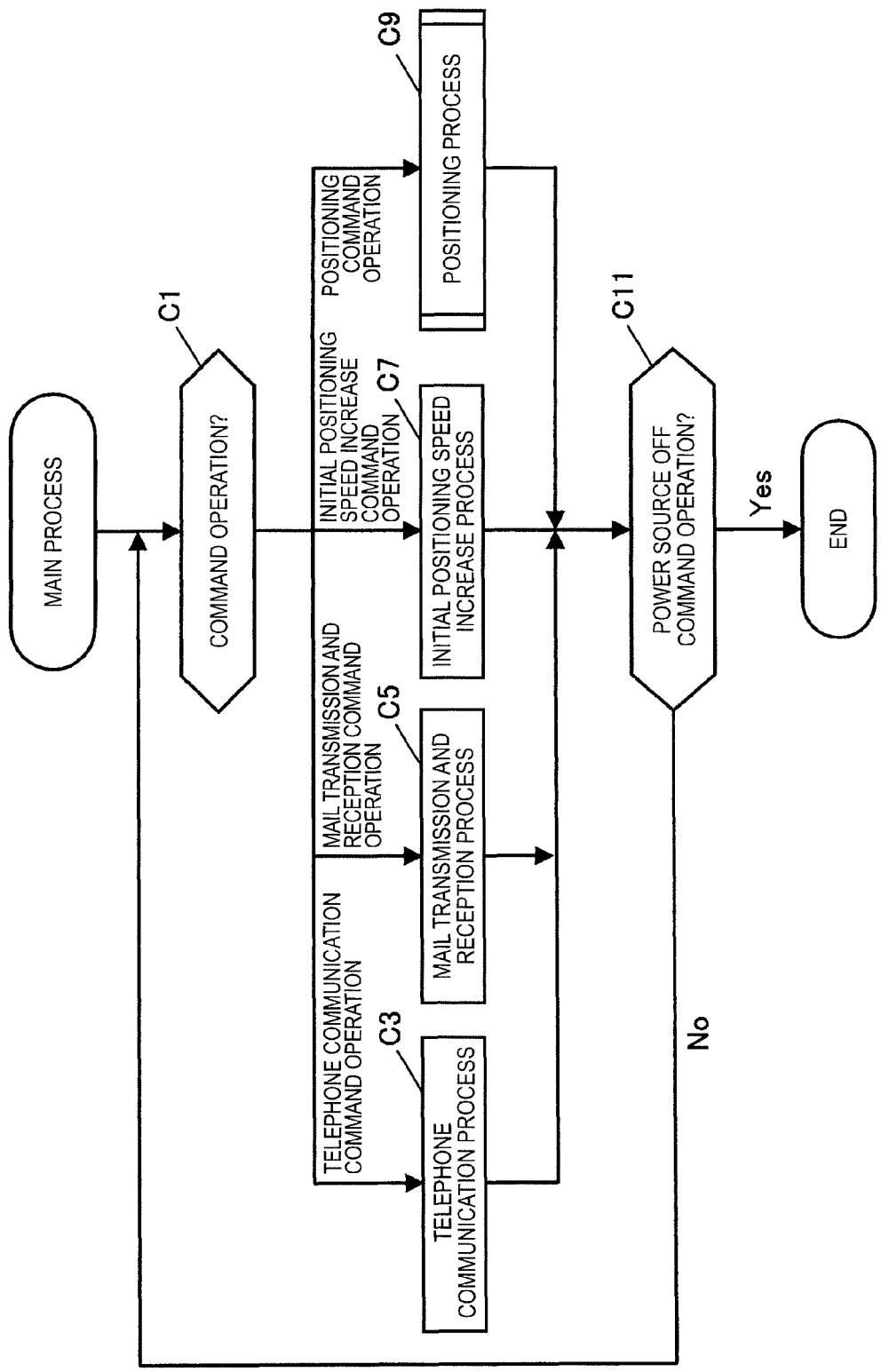
FIG. 19 is a flowchart showing flow of main process.

FIG. 19 is a flowchart showing the flow of the main process performed by the cellular phone 4 under the main program 471 in the ROM 470 read and performed by the host CPU 420.

The main process starts when the host CPU 420 detects that the user has executed power ON operation through the operation unit 430. Though not particularly explained, reception of RF signals by the GPS antenna 405 and down-conversion of RF signals into IF signals by the RF receiving circuit unit 411 are carried out while the main process is performed. In this condition, IF signals are outputted to the baseband processing circuit unit 413 as necessary.

Initially, the host CPU 420 judges command operation given through the operation unit 430 (step C1). When it is judged that the command operation is telephone communication command operation (step C1; telephone communication command operation), telephone communication process is performed (step C3). More specifically, the host CPU 420 commands the cellular phone wireless communication circuit unit 460 to provide base station communication with the wireless base station such that telephone communication can be provided between the cellular phone 4 and other device.

When it is judged that the command operation is mail transmission and reception command operation in step C1 (step C1; mail transmission and reception command operation), the host CPU 420 performs mail transmission and reception process (step C5). More specifically, the host CPU 420 commands the cellular phone wireless communication circuit unit 460 to provide base station communication with the wireless base station such that mail transmission and reception can be provided between the cellular phone 4 and other device.

When it is judged that the command operation is initial positioning speed increase command operation in step C1 (step C1; initial positioning speed increase command operation), the host CPU 420 performs initial positioning speed increase process (step C7). More specifically, the host CPU 420 transmits a request signal for the long-term prediction ephemeris data 357 to the server system 3. Then, the CPU 420 receives the long-term prediction ephemeris data 357 from the server system 3 and stores the ephemeris data 357 in the flash ROM 480.

When it is judged that the command operation is positioning command operation in step C1 (step C1; positioning command operation), the host CPU 420 performs positioning process by reading and executing the positioning program 4711 stored in the ROM 470 (step C9).

Figure 20:
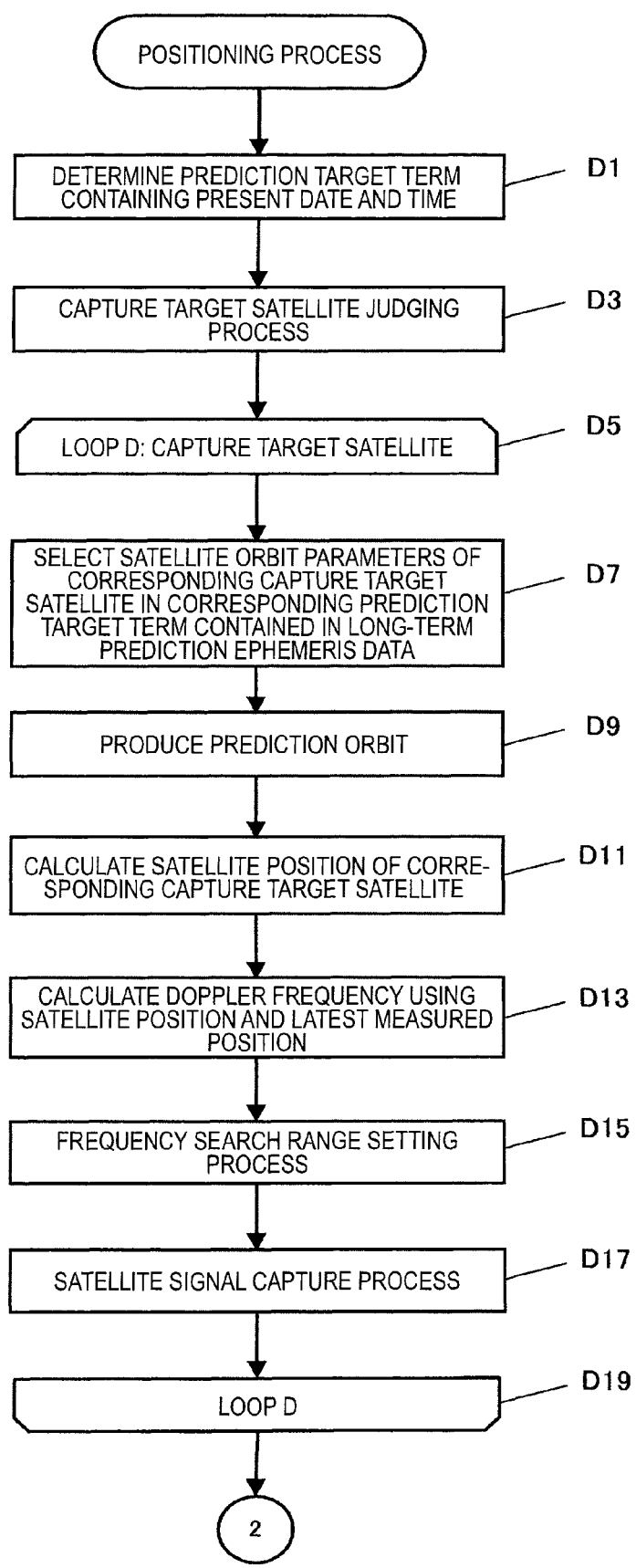
FIG. 20 is a flowchart showing flow of positioning process.
Figure 21:
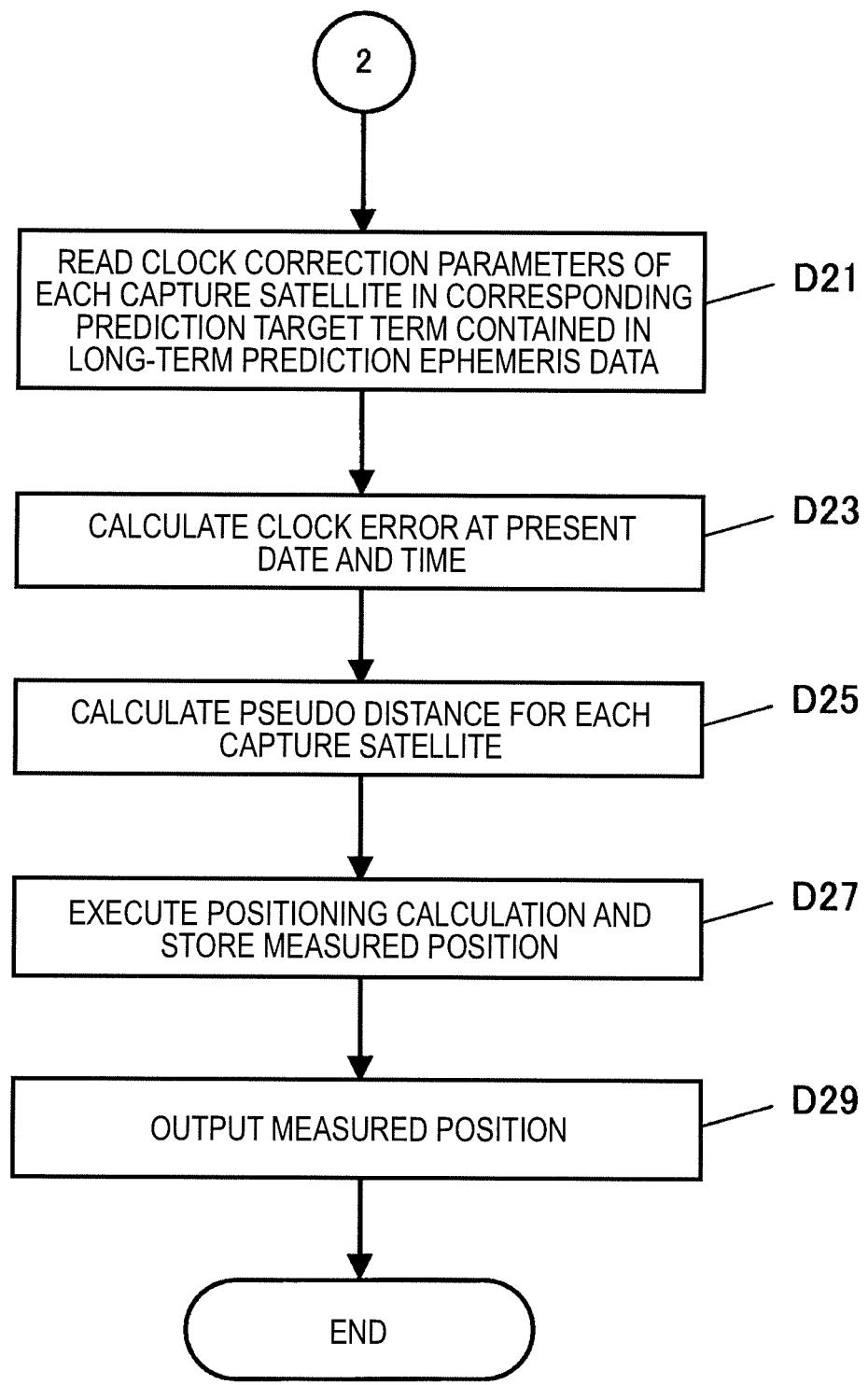
FIG. 21 is a flowchart showing flow of the positioning process.

FIGS. 20 and 21 are flowcharts showing the flow of the positioning process.

Initially, the host CPU 420 determines the prediction target term including the present date and time (hereinafter referred to as "corresponding prediction target term") (step D1). Then, the host CPU 420 executes capture target satellite judging process (step D3). More specifically, the host CPU 420 determines the GPS satellite SV located in the sky above the latest measured position 481 stored in the flash ROM 480 at the present date and time according to a not-shown clock unit by using the long-term prediction ephemeris data 357 stored in the hard disk 350, and sets the determined GPS satellite SV as capture target satellite.

The host CPU 420 performs the process of loop D for each of the capture target satellites (steps D5 through D19). In the process of loop D, the host CPU 420 selects satellite orbit parameters of the corresponding capture target satellite contained in the long-term prediction ephemeris data 357 in the flash ROM 480 for the corresponding prediction target term (step D7).

The host CPU 420 produces prediction orbit based on the Kepler's elliptic orbit model using the satellite orbit parameters selected in step D7 (step D9). Then, the host CPU 420 calculates the satellite position of the corresponding capture target satellite at the present date and time based on the prediction orbit thus produced (step D11).

The host CPU 420 calculates Doppler frequency at the time of reception of GPS satellite signal of the corresponding capture target satellite at the latest measured position 481 by using the satellite position calculated in step D11 and the latest measured position 481 stored in the flash ROM 480 (step D13).

The host CPU 420 performs frequency search range setting process for setting a frequency search range at the time of reception of the GPS satellite signal from the corresponding capture target satellite by using the Doppler frequency calculated in step D13 (step D15). That is, the search range of frequency is widened or narrowed according to the level of the Doppler frequency.

The host CPU 420 executes satellite signal capture process to capture the GPS satellite signal transmitted from the corresponding capture target satellite by executing frequency search in the frequency search range set in step D15 by using the CPU 415 of the baseband processing circuit unit 413 (step D17). Then, the host CPU 420 shifts the flow to the next capture target satellite.

After finishing the processes in steps D7 through D17 for all of the capture target satellites, the host CPU 420 ends the process of loop D (step D19). Then, the host CPU 420 reads clock correction parameters of the respective captured satellites contained in the long-term prediction ephemeris data 357 in the flash ROM 480 for the corresponding prediction target term (step D21).

The host CPU 420 calculates clock error at the present date and time by the equation (1) using the clock correction parameters read in step D21 (step D23). Then, the host CPU 420 calculates pseudo distances between the cellular phone 4 and the captured satellites based on each transmission time of the GPS satellite signals from the captured satellites and each reception time of the GPS satellite signals by the cellular phone 4, and the clock error calculated in step D23 (step D25).

The host CPU 420 performs predetermined positioning calculation by using the pseudo distances calculated in step D25 to store the measured position 491 in the RAM 490 and the latest measured position 481 in the flash ROM 480 (step D27). This positioning calculation may be performed by a known method such as minimum square method and Karman filter method.

The CPU 420 outputs the measured position 491 stored in the RAM 490 to the display unit 440 to display the measured position 491 on the navigation screen (step D29), and ends the positioning process.

Returning to the main process shown in FIG. 19, the host CPU 420 judges whether power OFF command operation has been performed by the user through the operation unit 430 after performing any of the processes in steps C3 through C9 (step C11). When it is judged that the power OFF command operation has not been performed (step C11; NO), the flow returns to step C1. When it is judged that the power OFF command operation has been performed (step C11; YES), the main process ends.

5. Operation and Advantage

According to the positioning system 1, the server system 3 varies the lengths of the prediction target terms as divisions of the predetermined effective period of the satellite orbit such that the lengths of the terms increase as the terms become newer. More specifically, the server system 3 sets a larger length for the prediction target term as the prediction error corresponding to the difference between the actual position of the GPS satellite SV associated with the past prediction position contained in the satellite precision almanac obtained from the external system 2 and the past prediction position contained in the satellite prediction almanac obtained from the external system 2 becomes larger. Then, the server system 3 calculates the prediction orbit of the GPS satellite SV according to the Kepler's elliptic orbit model based on the satellite prediction almanac for each of the plural prediction target terms set beforehand to calculate the satellite orbit parameters. Subsequently, the server system 3 produces long-term prediction ephemeris data containing the calculated satellite orbit parameters for each of the prediction target terms, and supplies the long-term prediction ephemeris data to the cellular phone 4.

On the other hand, the cellular phone 4 selects the satellite orbit parameters for the prediction target term corresponding to positioning time from the long-term prediction ephemeris data obtained from the server system 3. Then, the cellular phone 4 produces prediction orbit of the GPS satellite SV by using the selected satellite orbit parameters to calculate the satellite position of the GPS satellite SV based on the produced prediction orbit. Subsequently, the cellular phone 4 captures the GPS satellite signal transmitted from the corresponding GPS satellite SV and performs the predetermined positioning calculation based on the captured GPS satellite signal to measure the position of the cellular phone 4.

By setting the lengths of the prediction target terms of the satellite orbit such that the lengths increase as the terms become newer, more effective long-term prediction ephemeris data can be produced and provided considering the relationship between the prediction errors and the periods of modeling of the satellite orbits. Since changes of the prediction errors with elapse of time differ depending on the GPS satellites SV, the prediction target terms are set variable according to each GPS satellite SV in this embodiment. Thus, long-term prediction ephemeris data can be produced with prediction target terms set appropriate for each GPS satellite.

6. Modified Example

6-1. Positioning System

According to this embodiment, the positioning system 1 including the server system 3 and the cellular phone 4 has been discussed. However, the positioning system according to the embodiment of the invention may be included in an electronic device provided with a positioning device such as portable-type personal computer, PDA (personal digital assistant), and car navigation device.

While the server system 3 is provided as one type of information providing device in this embodiment, the information providing device may be a general-purpose personal computer, for example.

6-2. Satellite Positioning System

While the GPS is used as the satellite positioning system in this embodiment, the satellite positioning system may be WAAS (wide area augmentation system), QZSS (quasi zenith satellite system), GLONASS (global navigation satellite system), GALILEO or other satellite positioning systems.

6-3. Production of Long-Term Prediction Ephemeris

According to the embodiment described above, the server system 3 produces long-term prediction ephemeris data and supplies the produced ephemeris data to the cellular phone 4. However, the cellular phone 4 may produce long-term prediction ephemeris data. More specifically, the cellular phone 4 periodically obtains satellite prediction almanac and satellite precision almanac from the external system 2, and performs the long-term prediction ephemeris producing process described above by using the obtained satellite prediction almanac and satellite precision almanac to produce long-term prediction ephemeris data. This applies to other electronic devices such as portable-type personal computer, PDA, and car navigation device including a positioning device instead of the cellular phone 4.

According to the embodiment described above, the server system 3 produces long-term prediction ephemeris data at predetermined time intervals (such as once for every four hours) beforehand, and sends the produced long-term prediction ephemeris data when receiving a request for long-term prediction ephemeris data from the cellular phone 4. However, the server system 3 may produce and send long-term prediction ephemeris data to the cellular phone 4 when receiving the request for long-term prediction ephemeris data from the cellular phone 4.

6-4. Production Target Period

According to the embodiment described above, long-term prediction ephemeris is produced for one week from the date and time of producing long-term prediction ephemeris as production target period. However, the production target period may be a period longer than one week (such as two weeks), or a period shorter than one week (such as three days). The effective period of ephemeris as navigation data transmitted from a GPS satellite is generally about four hours. Long-term prediction ephemeris is only required to have effective period longer than that of ephemeris as navigation data sent from a GPS satellite. It is preferable that the effective period of long-term prediction ephemeris is 1 day or more.

6-5. Prediction Target Term

According to the embodiment described above, the length of the prediction target term is selected from four hours, six hours, and eight hours. However, the length is not limited to these three types but may be appropriately varied such as two hours and twelve hours.

What is claimed is:

1. A parameter calculating method comprising:
   adjusting length of a prediction target term, the prediction target term being a sub-period of a predetermined effective period of a satellite orbit of a positioning satellite; and
   calculating a parameter of a predetermined orbit model expression for approximating the satellite orbit based on prediction position data containing time-series prediction positions of the positioning satellite,
   the adjusting of the length of the prediction target term including setting the length of the prediction target term based on difference between a past prediction position and a past actual position of the positioning satellite such that the length increases as the difference between the past prediction position and the past actual position becomes large.

2. The parameter calculating method according to claim 1, further comprising:
   setting the length of the prediction target term as variable for each of the positioning satellite; and
   calculating the parameters for the prediction target term for each of the positioning satellite.

3. The parameter calculating method according to claim 1, further comprising
   calculating a parameter of a predetermined clock error model expression used for approximating change of clock prediction error of the positioning satellite at the prediction positions with elapse of time based on clock prediction error data containing the clock prediction error for the same term as the prediction target term.

4. An information providing method comprising:
   adjusting length of a prediction target term, the prediction target term being a sub-period of a predetermined effective period of a satellite orbit of a positioning satellite;
   calculating a parameter of a predetermined orbit model expression for approximating the satellite orbit based on prediction position data containing time-series prediction positions of the positioning satellite; and
   providing long-term prediction orbit data containing the calculated parameters for the prediction target term,
   the adjusting of the length of the prediction target term including setting the length of the prediction target term based on difference between a past prediction position and a past actual position of the positioning satellite such that the length increases as the difference between the past prediction position and the past actual position becomes large.

5. An information providing device comprising:
   a setting unit which adjusts length of a prediction target term, the prediction target term being a sub-period of a predetermined effective period of a satellite orbit of a positioning satellite;
   a calculating unit which calculates a parameter of a predetermined orbit model expression for approximating the satellite orbit based on prediction position data containing time-series prediction positions of the positioning satellite; and a providing unit which provides long-term prediction orbit data containing the parameters calculated by the calculating unit for the prediction target term to a positioning device, the setting unit which adjusts the length of the prediction target term by setting the length of the prediction target term based on difference between a past prediction position and a past actual position of the positioning satellite such that the length increases as the difference between the past prediction position and the past actual position becomes large.

* * * * *